United States Patent
Corns

(10) Patent No.: US 12,333,633 B2
(45) Date of Patent: Jun. 17, 2025

(54) TECHNOLOGIES FOR COMPUTED TOMOGRAPHY IMAGE RECONSTRUCTION OF MOVING OBJECTS

(71) Applicant: Robert Allan Corns, Greenville, NC (US)

(72) Inventor: Robert Allan Corns, Greenville, NC (US)

( * ) Notice: Subject to any disclaimer, the term of this patent is extended or adjusted under 35 U.S.C. 154(b) by 725 days.

(21) Appl. No.: 17/549,140

(22) Filed: Dec. 13, 2021

(65) Prior Publication Data
US 2023/0186531 A1    Jun. 15, 2023

(51) Int. Cl.
*G06T 11/00*    (2006.01)
*G06T 7/20*    (2017.01)

(52) U.S. Cl.
CPC .............. *G06T 11/005* (2013.01); *G06T 7/20* (2013.01); *G06T 2207/10081* (2013.01)

(58) Field of Classification Search
None
See application file for complete search history.

(56) References Cited

U.S. PATENT DOCUMENTS

| | | | | |
|---|---|---|---|---|
| 2007/0253523 | A1* | 11/2007 | Zamyatin | G06T 11/005 378/4 |
| 2009/0141852 | A1* | 6/2009 | Wang | G06T 11/005 378/4 |
| 2017/0365075 | A1* | 12/2017 | Meganck | G06T 11/006 |

OTHER PUBLICATIONS

S. Ouadah, M. Jacobson, J.W. Stayman, T. Ehtiati, C. Weiss, J.H. Siewerdsen, "Correction of Patient Motion in Cone-Beam CT Using 3D-2D Registration", Phys. Med Bio. Nov. 9, 2017; vol. 62 No. 23, pp. 8813-8831.

A. Sisniega, J.W. Stayman, J. Yorkston, J.H. Siewerdsen, W. Zbijewski, "Motion Compensation in Extremity Cone-Beam CT Using a Penalized Image Sharpness Criterion", Physics in Medicine & Biology, vol. 62, No. 9, Apr. 6, 2017.

Tao Sun, Jung-Ha Kim, Roger Fulton, Johan Nuyts, "An Iterative Projection-Based Motion Estimation and Compensation Scheme for Head X-Ray CT", Med Phys. Oct. 2016, vol. 43 No. 10.

Seokhwan Jang, Seungeon Kim, Mina Kim, Jong Beom RA, "Head Motion Correction Based on Filtered Backprojection for X-Ray CT Imaging", Med Phys Feb. 2018, vol. 45 No. 2.

(Continued)

*Primary Examiner* — Nancy Bitar
(74) *Attorney, Agent, or Firm* — Barnes & Thornburg, LLP

(57) ABSTRACT

Technologies for computed tomography (CT) image reconstruction of moving objects include a computing device coupled to a CT scanner. The computing device captures sinogram data indicative of one or more moving objects and determines a trajectory for each object. The trajectory may be determined as a function of the sinogram data. To do so, the computing device may determine an enveloping curve from a set of intersections of sequential projections and identify a tangent line that touches the enveloping curve at two points. The computing device determines a trajectory sum as a function of the sinogram and the trajectory of each object. Determining the trajectory sum includes calculating a line integral along the trajectory in the sinogram space. The computing device may splice or interpolate combined sinogram data to generate sinogram data for each object. The computing device generates an image of each object based on the trajectory sum.

14 Claims, 11 Drawing Sheets

(56) References Cited

OTHER PUBLICATIONS

Seokhwan Jang, Seungeon Kim, Mina Kim, Kihong Son, Kyoung-Yong Lee, Jong Beom RA, Head Motion Correction Based on Filtered Backprojection in Helical CT Scanning, IEEE Transaction on Medical Imaging, vol. 39 Issue 5, May 2020.

Matthew W. Jacobson, J. Webster Stayman, "Compensating for Head Motion in Slowly-Rotating Cone Beam CT Systems With Optimization Transfer Based Motion Estimation", IEEE Nuclear Science Symposium Conference Record, Oct. 19-25, 2008.

H. Bruder, C. Rohkohl, K. Stierstorfer, T. Flohr, "Compensation of Skull Motion and Breathing Motion in CT Using Data-Based and Image-Based Metrics, Respectively", Proc. SPIE 9783, Medical Imaging 2016: Physics of Medical Imaging, 97831E (Mar. 22, 2016); https://doi.org/10.1117/12.2217395.

Seungeon Kim, Yongjin Chang, Jong Beom RA, "Cardiac Motion Correction Based on Partial Angle Reconstructed Images in X-Ray CT", Med Phys, May 2015, vol. 42 No. 5.

Seungeon Kim, Yongjin Chang, Jong Beom RA, "Cardiac Image Reconstruction via Nonlinear Motion Correction Based on Partial Angle Reconstructed Images", IEEE Trans Med Imaging, May 2017, vol. 36 No. 5.

Seungeon Kim, Yongjin Chang, Jong Beom RA, "Cardiac Motion Correction for Helical CT Scan With an Ordinary Pitch", IEEE Trans Med Imaging, Jul. 2018, vol. 37 No. 7.

M Berger, K Muller, A Aichert, M Unberath, J Thies, J-H Choi, R Fahrig, A Maier, "Marker-Free Motion Correction in Weight-Bearing Cone-Beam CT of the Knee Joint", Med Phys. Mar. 2016, vol. 43 No. 3.

Christopher Rohkohl, Herbert Bruder, Karl Stierstorfer, Thomas Flohr, "Improving Best-Phase Image Quality in Cardiac CT by Motion Correction With MAM Optimization", Med Phys. Mar. 2013, vol. 40 No. 3.

Dirk Schafer, Matthias Bertram, Norbert Conrads, Jens Wiegert, Georg Rose, Volker Rasche, "Motion Compensation for Cone-Beam CT Based on 4D Motion Field of Sinogram Tracked Markers", ScienceDirect International Congress Series, vol. 1268, Jun. 2004, pp. 189-194.

Marcus Brehm, Pascal Paysan, Markus Oelhafen, Marc Kachelreiss, "Artifact-Resistant Motion Estimation With a Patient-Specific Artifact Model for Motion-Compensated Cone-Beam CT", Med Phys Oct. 2013, vol. 40 No. 10.

Cameron J. Ritchie, Carl R. Crawford, J. David Godwin, Kevin F. King, Yongmin Kim, "Correction of Computed Tomography Motion Artifacts Using Pixel-Specific Back-Projection", IEEE Transactions on Medical Imaging, vol. 15 Issue 3, Jun. 1996.

Carl R Crawford, Kevin F King, Cameron J Ritchie, J David Godwin, "Respiratory Compensation in Projection Imaging Using a Magnification and Displacement Model", IEEE Trans Med Imaging, 1996, vol. 15 No. 3.

Isabelle Marie Gagne, "The Impact of Tumor Motion Upon CT Image Reconstruction", Thesis submitted to Department of Physics, Edmonton, Alberta, Fall 2005.

N.C. Linney, P.H. Gregson, "Ogan Motion Detection In CT Images Using Opposite Rays in Fan-Beam Projection Systems", IEEE Trans Med Imaging, 2001, vol. 20 No. 11.

Weiguo Lu, Thomas R. Mackie, "Tomographic Motion Detection And Correction Directly in Sinogram Space", Phys. Med. Biol. 47, 2002, pp. 1267-1284.

Weihua Mao, Tianfang Li, Nicole Wink, Lei Xing, "CT Image Registration In Sinogram Space", Medical Physics, Sep. 2007, vol. 34, No. 9.

* cited by examiner

TECHNOLOGIES FOR COMPUTED TOMOGRAPHY IMAGE RECONSTRUCTION OF MOVING OBJECTS

BACKGROUND

Computed tomography (CT) scanners generate three-dimensional imagery of objects and may be used for medical imaging, nondestructive testing, and other uses. Typically, a filtered back projection algorithm may be used to reconstruct images from data captured by the CT scanners. Typical filtered back projection algorithms require imaged objects to be stationary. Using a typical filtered back projection algorithm in the presence of moving objects results in blurring or other artifacts in the reconstructed images.

SUMMARY

According to one aspect of the disclosure, a computing device for computed tomographic (CT) imaging includes a scan controller, a trajectory mapper, a projection engine, and an image manager. The scan controller is to capture sinogram data indicative of a first object with a CT scanner. The sinogram data comprises projection data captured by the CT scanner arranged in a sinogram space. The trajectory mapper is to determine a first trajectory of the first object. The projection engine is to determine a trajectory sum as a function of the sinogram data and the first trajectory, wherein the trajectory sum is associated with a portion of the first object, and wherein to determine the trajectory sum comprises to calculate a line integral of filtered projection data along the first trajectory in the sinogram space of the sinogram data. The image manager is to generate an image of the first object based on a determination of the trajectory sum.

In an embodiment, to determine the first trajectory comprises to select a predetermined trajectory. In an embodiment, to determine the first trajectory comprises to determine the first trajectory with a computational model of the first object.

In an embodiment, to determine the first trajectory comprises to determine the first trajectory as a function of the sinogram data. In an embodiment, a fiducial marker is attached to the first object. In an embodiment, to determine the first trajectory as a function of the sinogram data comprises to determine a set of projection intersections, wherein each projection intersection is defined by an adjacent, sequential pair of projections, wherein each of the projections is associated with a point of interest of the first object; determine a curve defined by the set of projection intersections; determine a tangent line that touches the curve at two points; determine a first motion path based on intersections of the projections and the tangent line; and determine the first trajectory based on the first motion path.

In an embodiment, to determine the tangent line comprises to determine a slope-intercept pair for each line segment of the curve, wherein the curve comprises a plurality of line segments and wherein each line segment is defined by a pair of adjacent projection intersections; determine a first set of slope-intercept pairs associated with a first half rotation of the curve and a second set of slope-intercept pairs associated with a second half rotation of the curve; and find a slope-intercept intersection between the first set of slope-intercept pairs and the second set of slope-intercept pairs. The tangent line comprises the slope and the intercept of the slope-intercept intersection.

In an embodiment, to capture the sinogram data comprises to capture sinogram data indicative of the first object and a second object. The trajectory mapper is further to determine a second trajectory of the second object, and the projection engine is further to determine a second trajectory sum as a function of the sinogram data and the second trajectory. The second trajectory sum is associated with a portion of the second object. To generate the image comprises to generate a merged image of the first object and the second object based on a determination of the second trajectory sum. In an embodiment, the first trajectory comprises a stationary trajectory and the second trajectory comprises a non-stationary trajectory.

In an embodiment, the computing device further includes a combined motion engine to splice sinogram data from a first region of the sinogram space into a second region of the sinogram space in response to a determination of the first trajectory and the second trajectory. The first region and the second region are associated with the first object and are spaced apart by a half rotation. The second region is obscured by the second object. To determine the trajectory sum comprises to determine the trajectory sum in response to a splicing of the sinogram data.

In an embodiment, the combined motion engine is further to interpolate sinogram data for a third region of the sinogram space and a fourth region of the sinogram space in response to the determination of the first trajectory and the second trajectory, wherein the third region and the fourth region are associated with the first object and spaced apart by a half rotation, and wherein the third region and the fourth region are obscured by the second object. To determine the trajectory sum further comprises to determine the trajectory sum in response to interpolation of the sinogram data.

In an embodiment, the computing device further includes a combined motion engine to subtract sinogram data associated with the first object from the sinogram data. To determine the second trajectory sum comprises to determine the second trajectory sum in response to subtraction of the sinogram data.

According to another aspect, one or more computer-readable storage media include a plurality of instructions that, when executed, cause a computing device to capture sinogram data indicative of a first object using a computed tomographic (CT) scanner, wherein the sinogram data comprises projection data captured by the CT scanner arranged in a sinogram space; determine a first trajectory of the first object; determine a trajectory sum as a function of the sinogram data and the first trajectory, wherein the trajectory sum is associated with a portion of the first object, and wherein to determine the trajectory sum comprises to calculate a line integral of filtered projection data along the first trajectory in the sinogram space of the sinogram data; and generate an image of the first object in based on determining the trajectory sum.

In an embodiment, to determine the first trajectory comprises to determine the first trajectory as a function of the sinogram data. In an embodiment, to determine the first trajectory as a function of the sinogram data comprises to determine a set of projection intersections, wherein each projection intersection is defined by an adjacent, sequential pair of projections, wherein each of the projections is associated with a point of interest of the first object; determine a curve defined by the set of projection intersections; determine a tangent line that touches the curve at two points; determine a first motion path based on intersections of the projections and the tangent line; and determine the first trajectory based on the first motion path.

In an embodiment, the one or more computer-readable storage media further include a plurality of instructions that, when executed, cause the computing device to determine a second trajectory of a second object; and determine a second trajectory sum as a function of the sinogram data and the second trajectory, wherein the second trajectory sum is associated with a portion of the second object. To capture the sinogram data comprises to capture sinogram data indicative of the first object and the second object; and to generate the image comprises to generate a merged image of the first object and the second object based on determining the second trajectory sum.

According to yet another aspect, a method for computed tomographic (CT) imaging includes capturing, by a computing device, sinogram data indicative of a first object using a CT scanner, wherein the sinogram data comprises projection data captured by the CT scanner arranged in a sinogram space; determining, by the computing device, a first trajectory of the first object; determining, by the computing device, a trajectory sum as a function of the sinogram data and the first trajectory, wherein the trajectory sum is associated with a portion of the first object, and wherein determining the trajectory sum comprises calculating a line integral of filtered projection data along the first trajectory in the sinogram space of the sinogram data; and generating, by the computing device, an image of the first object based on determining the trajectory sum.

In an embodiment, determining the first trajectory comprises determining the first trajectory as a function of the sinogram data. In an embodiment, determining the first trajectory as a function of the sinogram data comprises determining a set of projection intersections, wherein each projection intersection is defined by an adjacent, sequential pair of projections, wherein each of the projections is associated with a point of interest of the first object; determining a curve defined by the set of projection intersections; determining a tangent line that touches the curve at two points; determining a first motion path based on intersections of the projections and the tangent line; and determining the first trajectory based on the first motion path.

In an embodiment, the method further comprises determining, by the computing device, a second trajectory of a second object; and determining, by the computing device, a second trajectory sum as a function of the sinogram data and the second trajectory, wherein the second trajectory sum is associated with a portion of the second object. Capturing the sinogram data comprises capturing sinogram data indicative of the first object and the second object; and generating the image comprises generating a merged image of the first object and the second object based on determining the second trajectory sum.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
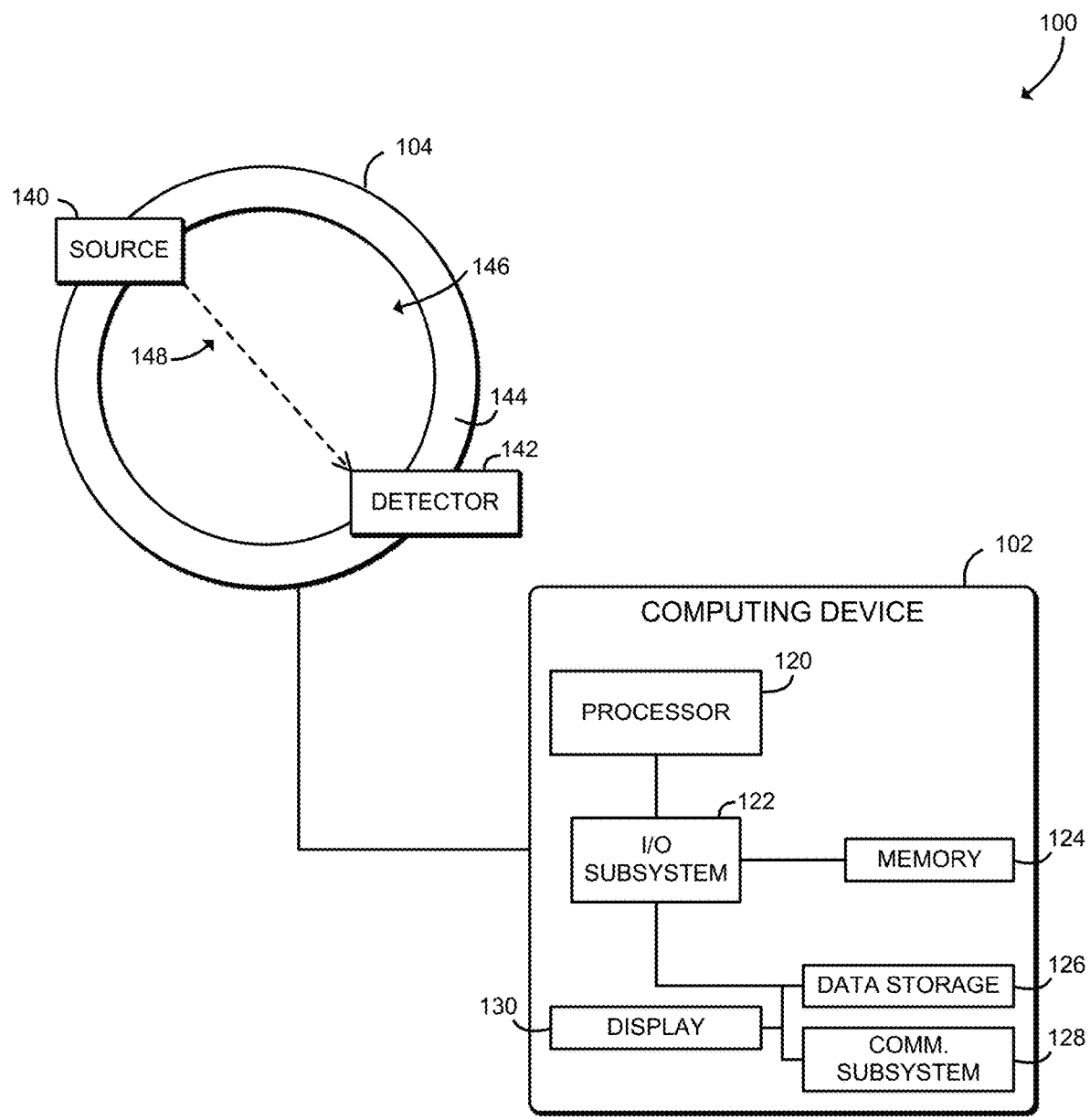
FIG. 1 is a simplified block diagram of at least one embodiment of a system for CT image reconstruction of moving objects.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 for computed tomography (CT) image reconstruction for moving objects includes a computing device 102 coupled to a CT scanner 104. In use, the CT scanner 104 scans one or more objects, which may be stationary or in motion. The computing device 102 captures scan data generated by the CT scanner 104, determines trajectories for any objects that are in motion, and reconstructs an image of the scanned objects, including any objects that were in motion. Thus, the system 100 may provide improved CT image quality for moving objects as compared to traditional CT scan systems. Additionally, because the system 100 allows moving objects to be imaged, the overall CT scan experience may be improved for operators and patients. For example, a patient or other object may not need to be immobilized during a scan, which may improve scanning comfort and/or efficiency. As another example, because moving objects may be imaged successfully, scans may not need to be repeated if the subject moves, which may improve scanning efficiency and total imaging throughput.

The computing device 102 may be embodied as any type of device capable of performing the functions described herein. For example, the computing device 102 may be embodied as, without limitation, a workstation, a desktop computer, a laptop computer, a server, a rack-mounted server, a blade server, a network appliance, a web appliance, a tablet computer, a smartphone, a consumer electronic device, a distributed computing system, a multiprocessor system, and/or any other computing device capable of performing the functions described herein. Additionally, in some embodiments, the computing device 102 may be embodied as a "virtual server" formed from multiple computing devices distributed across a network and operating in a public or private cloud. Accordingly, although the computing device 102 is illustrated in FIG. 1 as embodied as a single computing device, it should be appreciated that the computing device 102 may be embodied as multiple devices cooperating together to facilitate the functionality described below. As shown in FIG. 1, the illustrative computing device 102 includes a processor 120, an I/O subsystem 122, memory 124, a data storage device 126, and communication circuitry 128. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the computing device 102 may be embodied as any communication circuit, device, or collection thereof, capable of enabling communications between the computing device 102 and remote devices. The communication circuitry 128 may be configured to use any one or more communication technology (e.g., wireless or wired communications) and associated protocols (e.g., Ethernet, Bluetooth®, WiMAX, etc.) to effect such communication.

As shown in FIG. 1, the computing device 102 may include a display 130. The display 130 may be embodied as any type of display capable of displaying digital images or other information, such as a liquid crystal display (LCD), a light emitting diode (LED), a plasma display, a cathode ray tube (CRT), or other type of display device. As described further below, the display 130 may be used to display reconstructed images of objects scanned by the CT scanner 104. In some embodiments, the display 130 may be coupled to a touch screen to allow user interaction with the computing device 102.

The CT scanner 104 includes a radiation source 140 and a detector 142. The radiation source 140 is illustratively an X-ray generator; however, in other embodiments the radiation source 140 may be embodied as any source of radiation that may be used to image an object. The source 140 may emit radiation in parallel rays, in a fan beam, in a cone beam, or in any other appropriate beam form. The detector 142 may be embodied as any device or devices configured to detect radiation emitted by the source 140, and is illustrative embodied as an array of X-ray detectors. The source 140 and the detector 142 are mounted on a rotatable gantry or ring 144 that surrounds an opening 146. In use, an object (e.g., a patient or other subject) may be placed within the opening 146. The gantry 144 causes the source 140 and the detector 142 to rotate around the opening 146 and thus around the object placed within. In some embodiments, the source 140 and the detector 142 may perform a complete rotation (i.e., 360 degrees) around the object. During this rotation, the source 140 emits radiation 148 (e.g., X-rays) and the detector 142 detects projections of the radiation 148 that are transmitted through and/or attenuated by the object. Accordingly, each detected projection is associated with a particular angle of rotation, and each angle of rotation is associated with a particular time index. Data generated by the detector 142 is provided to the computing device 102.

Additionally or alternatively, although illustrated in FIG. 1 as including a separate computing device 102 and CT scanner 104, it should be understood that in some embodiments, those components of the system 100 may be integrated in a single device.

Figure 2:
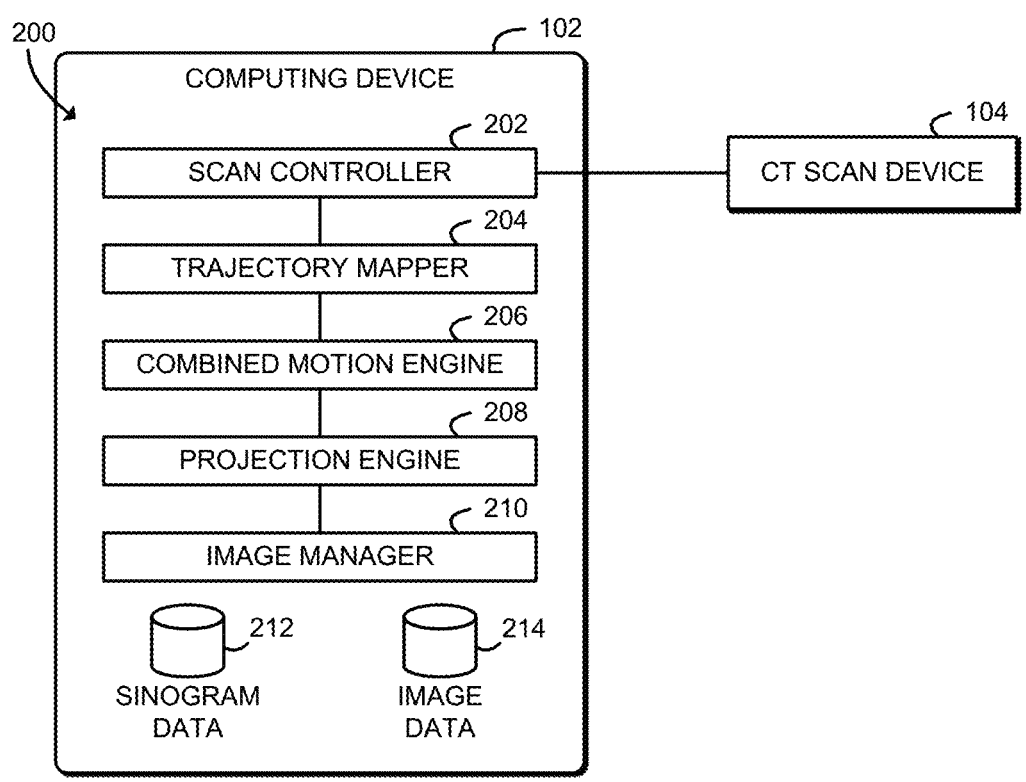
FIG. 2 is a simplified block diagram of at least one embodiment of an environment that may be established by a computing device of the system of FIG. 1.

Referring now to FIG. 2, in the illustrative embodiment, the computing device 102 establishes an environment 200 during operation. The illustrative environment 200 includes a scan controller 202, a trajectory mapper 204, a combined motion engine 206, a projection engine 208, and an image mapper 210. The various components of the environment 200 may be embodied as hardware, firmware, software, or a combination thereof. As such, in some embodiments, one or more of the components of the environment 200 may be embodied as circuitry or a collection of electrical devices (e.g., scan controller circuitry 202, trajectory mapper circuitry 204, combined motion engine circuitry 206, projection engine circuitry 208, and/or image mapper circuitry 210). It should be appreciated that, in such embodiments, one or more of those components may form a portion of the processor 120, the I/O subsystem 122, and/or other components of the computing device 102.

The scan controller 202 is configured to capture sinogram data 212 indicative of one or more objects using the CT scanner 104. The sinogram data 212 includes projection data captured by the CT scanner 104 arranged in a sinogram space. The sinogram space is a two- or three-dimensional space defined by a projection angle and projection coordinate(s).

The trajectory mapper 204 is configured to determine a trajectory for each object scanned in the sinogram data 212. Each trajectory may be stationary or non-stationary, and the sinogram data 212 may include any combination of stationary and non-stationary trajectories. Each trajectory may be determined by selecting a predetermined trajectory, determining a trajectory with a computational model of the object, by determining the trajectory as a function of the sinogram data.

Determining a trajectory as a function of the sinogram data 212 may include determining a set of projection intersections, determining a curve defined by the set of projection intersections, determining a tangent line that touches the curve at two points, determining a first motion path based on intersections of the projections and the tangent line, and determining the first trajectory based on the first motion path. Each projection intersection is defined by an adjacent, sequential pair of projections. Each of the projections is associated with a point of interest of the first object. In some embodiments, a fiducial marker may be attached to the first object at the point of interest of the first object. Additionally, in some embodiments, the curve includes multiple line segments that are each defined by a pair of adjacent projection intersections. Determining the tangent line may include determining a slope-intercept pair for each line segment of the curve, determining a first set of slope-intercept pairs associated with a first half rotation of the curve and a second set of slope-intercept pairs associated with a second half rotation of the curve, and finding a slope-intercept intersection between the first set of slope-intercept pairs and the second set of slope-intercept pairs. The tangent line is defined by the slope and the intercept of the slope-intercept intersection. In some embodiments, finding the slope-intercept intersection may include interpolating the slope-intercept intersection.

The combined motion engine 206 is configured to extract or otherwise generate sinogram data 212 indicative of a single object from sinogram data 212 that is indicative of multiple objects. In some embodiments, the combined motion engine 206 is configured to splice sinogram data 212 from a region of the sinogram space into another region of the sinogram space that is spaced apart by a half rotation. Each of those regions is associated with an object, and one of the regions but not the other is obscured by a different object. The combined motion engine 206 may be further configured to interpolate sinogram data 212 for a regions of the sinogram space that are associated with the object and that are both obscured by the second object. The combined motion engine 206 may be further configured to subtract sinogram data 212 associated with an object from the sinogram data 212.

The projection engine 208 is configured to determine a trajectory sum associated with each portion of an object as a function of the sinogram data 212 and the object's trajectory. Determining the trajectory sum includes calculating a line integral of filtered projection data along the trajectory in the sinogram space of the sinogram data 212. The trajectory sum may be determined in response to splicing, interpolating, and/or subtracting the sinogram data 212 as described above. The filtered projection data may include the projection data of the sinogram data 212 convolved by a ramp filter. The projection engine 208 may determine trajectory sums for each object as a function of the sinogram data 212 and that's object's trajectory.

The image mapper 210 is configured to generate an image of each object in response to determining the trajectory sum. The image includes multiple pixels, and each pixel is representative of a trajectory sum associated with a portion of the object. The image mapper 210 may generate a merged image of multiple scanned objects. The image may be stored in image data 214, and may be displayed using the display 130, communicated to a remote device using the communication subsystem 128, and/or otherwise processed by the computing device 102.

Figure 3:
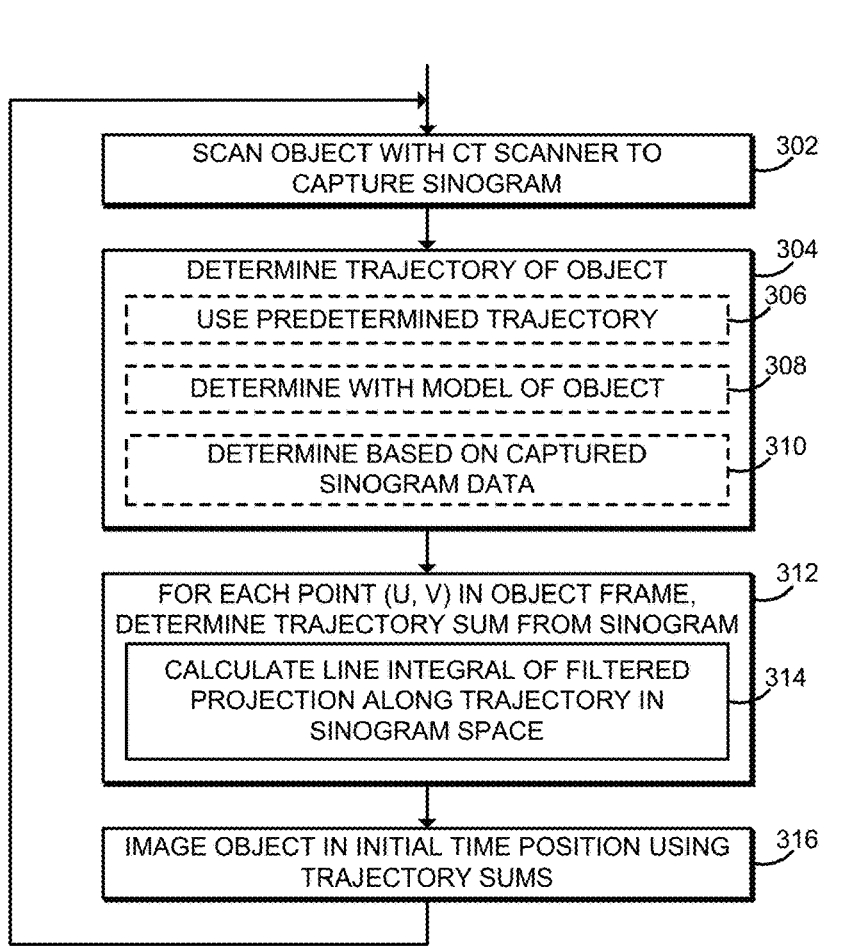
FIG. 3 is a simplified flow diagram of at least one embodiment of a method for CT image reconstruction of a moving object that may be executed by the system of FIGS. 1 and 2.

Referring now to FIG. 3, in use, the computing device 102 may execute a method 300 for image reconstruction of a moving object. It should be appreciated that, in some embodiments, the operations of the method 300 may be performed by one or more components of the environment 200 of the computing device 102 as shown in FIG. 2. The method 300 begins with block 302, in which the computing device 102 scans an object using the CT scanner 104 to capture sinogram data 212. The object may be any patient, body part, biological sample, device, material, or other object positioned within the opening 146 of the CT scanner 104 for scanning. The CT scanner 104 sweeps the source 140 and/or detector 142 through multiple sampling angles, and at each sampling angle captures multiple projections. Thus, time is an index for the position $(x_t, y_t)$ of a moving object and for each sampling angle $\theta_t$. In the illustrative embodiment, the CT scanner 104 may capture multiple parallel projections at each sampling angle, similar to a first-generation CT scanner. Additionally or alternatively, in some embodiments the CT scanner 104 may use a different arrangement of source 140 and/or detector 142. For example, a third generation CT scanner 140 may take fan beam projections on a detector array mounted on the scanner's ring/gantry 144. In those embodiments, the apex of the fan may be incremented through a series of sampled angles and the fan is sampled by a detector array. As another example, cone-beam CT may take conic projections on a flat panel detector. In those embodiments, the apex of the cone moves around a circle with a series of sampling angles, and the panel consists of an array of detectors that sample the fluence from each cone projection in two dimensions. For clarity, the present disclosure describes the image reconstruction of moving objects in terms that are independent of the specific nature of the data collection and organization and thus applies to multiple CT scanner variants. For clarity of presentation, in this disclosure, projections shall be treated as having been taken simultaneously and with small time steps between sampling angles. Such interpretation equates the first-generation data acquisition on par with fan beam or cone beam acquisition, which use detector arrays to acquire data simultaneously at each sampling angle. Further, it should be understood that two-dimensional spaces are described in detail herein, but extensions to three dimensions may be readily applied by those of ordinary skill in the art.

The object scanned by the CT scanner 104 may be modeled as a mapping from $\mathbb{R}^2 \to \mathbb{R}^3$ that assigns grayscale values $f$ to each point $(x, y) \to (x, y, f(x, y))$. The function $f$ is linked to a physical property of the scanned object, such as the linear attenuation coefficient $\mu$. During scanning, the projection angle $\theta$ (also called the sampling angle $\theta$) defines rotated coordinate axes $(\xi, \eta)$. In particular, the $\xi$-axis is rotated by angle $\theta$ relative to the x-axis, and the $(\xi, \eta)$ coordinates are linked to $(x, y)$ through a rotation matrix as shown in Equation (1). A projection p through the point $(x, y)$ taken at projection angle $\theta$ is a line integral taken on the line perpendicular to the axis defined by $\theta$, as illustrated in Equation (2). The set $\{(\theta, \xi, p(\theta, \xi))\}$ defines a sinogram space. Thus, a stationary point $(x, y)$ in the scanned object maps to a curve $\xi(\theta)$ in the sinogram space given by equation (2).

$$\begin{pmatrix} \xi \\ \eta \end{pmatrix} = \begin{pmatrix} \cos\theta & \sin\theta \\ -\sin\theta & \cos\theta \end{pmatrix} \begin{pmatrix} x \\ y \end{pmatrix} \quad (1)$$

$$p(\theta, \xi) = \int f(x, y) d\eta \quad (2)$$

In block 304, the computing device 102 determines a trajectory for the object. The trajectory describes motion of a reference point on the object in the sinogram space (i.e., as opposed to the object space). As described further below, the motion path of a point in the object space corresponds to a curve in the sinogram space. This trajectory in the sinogram space may be described as $\xi_t(\theta_t)$, that is, as a coordinate for a projection angle $\theta$ at each time index t. As described above, a stationary point in the object space maps to a curve $\xi(\theta)$ in the sinogram space. For parallel projection CT (e.g., first generation CT) this curve is a sine wave, but for fan beam (e.g., third generation) or cone beam CT these curves have different functional forms that are nevertheless well-defined. Conversely, a stationary point $(\theta, \xi)$ in the sinogram space maps to a curve in the object space. This curve is the projection line going through $(x, y)$ with projection angle $\theta$. For stationary points, the mapping of the point to the curve is one-to-one and onto. Specifying the curve uniquely defines the point and vice-versa.

However, the disclosed system 100 handles moving objects differently. Illustratively, the object is a rigid body of incompressible material that can be translated and/or rotated. The object may be moving through a media, displacing it, such as a solid moving through water or air. The object may interact with other moving objects as they move in response to each other. Illustratively, the object cannot be squashed or stretched, but one may think of the object as a collection of smaller, incompressible objects that are correlated in their motion. When the collection moves in a coordinated way, the object can appear to change shape. As an analogy, the collection of objects in motion may be like the shape of a large flock of birds or school of fish in motion. As an illustrative example, the scanned object may be embodied as a patient's lungs, which move about the patient's chest cavity during breathing. The patient's lungs, which typically stretch during breathing, may be handled as a collection of incompressible objects that are correlated in their motion.

Figure 4:
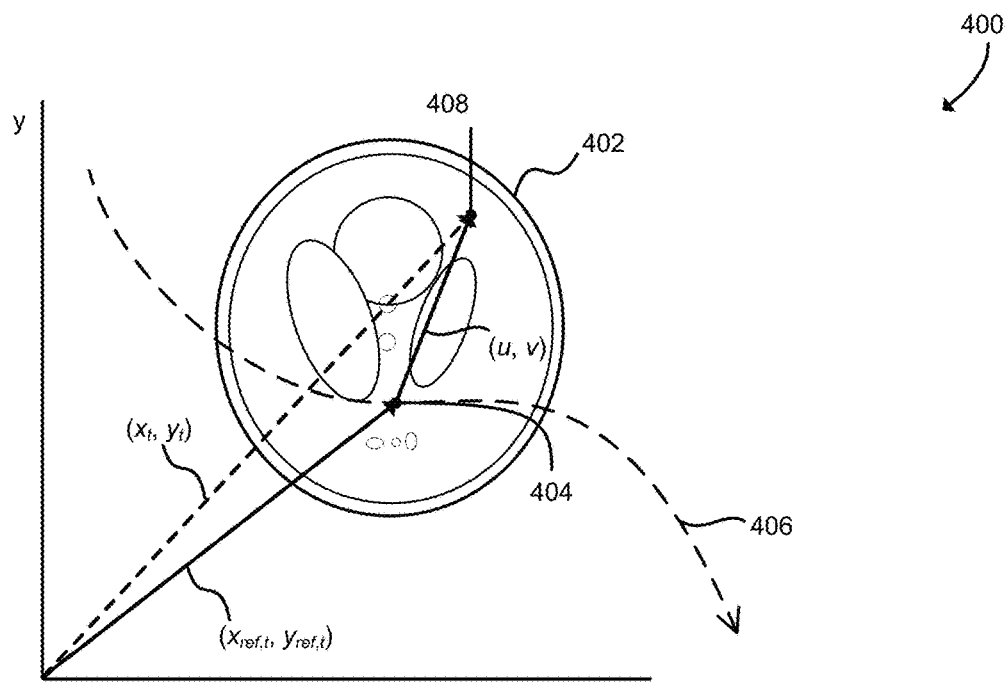
FIG. 4 is a schematic diagram illustrating a moving object that may be imaged using the method of FIG. 3.

As discussed above, the object may move in one of several different ways. For example, the object may exhibit translational motion. In such cases, the motion path of the object may be arbitrary, but the object does not change its orientation on the plane. Since the object is assumed to be and/or approximated as a rigid body, the system 100 specifies the motion of the object by the motion of one reference point on the object, with all other points on the object being related via a coordinate system in the object's frame of motion. Referring to FIG. 4, diagram 400 illustrates an object 402 in two-dimensional space $(x, y)$. As shown, an illustrative reference point 404 moves along a motion path 406 through $(x, y)$ space. The object 402 appears stationary in that frame of motion, and the reference point 404 can be set at the origin with other points of interest in the object, such as illustrative point 408, specified relative to the reference point 404 by a coordinate pair $(u, v)$. A 3-tuple $(u, v, f_0(u, v))$ thus describes the object 402. In particular, the system 100 sets a motion path for the object specified by the reference point $(x_{ref}, y_{ref})$, and points in the object at each time index $(x_t, y_t)$ move according to Equation (3), below. The function $f$ relates moving points to points on the stationary object, as shown in Equation (4). Projections $p_0(\theta, \phi)$ can be taken by the system 100 in this reference frame and the projections of the moving object will be related to this stationary projection.

$$\begin{pmatrix} x_t \\ y_t \end{pmatrix} = \begin{pmatrix} x_{ref,t} \\ y_{ref,t} \end{pmatrix} + \begin{pmatrix} u \\ v \end{pmatrix} \quad (3)$$

$$f(x_t, y_t) = f_0(u, v) \quad (4)$$

The computing device 102 may use any appropriate technique to determine the trajectory $\xi_t(\theta_t)$ of the object. Referring again to FIG. 3, in some embodiments, in block 306 the computing device 102 may use a predetermined trajectory. For example, the computing device 102 may assume that the object moves a small amount in a predetermined direction or otherwise assign a predetermined trajectory to the object. In some embodiments, in block 308 the computing device 102 may determine the trajectory using a computational model of the object. The model may be used, for example, to determine trajectories for objects that exhibit predictable motion that may be described in one or more computer models. One of the advantages that may be achieved by modeling is that the motion of the object is known and the system 100 can calculate the trajectory of each object point through the sinogram space. Of course, for in vivo measurements, the path of the moving object may not be known prior to measurement. In such embodiments, in block 310 the computing device 102 may determine the trajectory based on sinogram data captured by the CT scanner 104 as described above in connection with block 302. For example, the computing device 102 may identify a trajectory based on one or more fiducial markers or other known landmarks of the object that are identifiable in the sinogram data. That is, the trajectory $\xi_r(\theta_t)$ may be determined if there is a moving point with high contrast relative to its surroundings, such as if a small fiducial marker were present. A marker may be embodied as a small metal object, a dense object, a chemical marker, or any other object that has high contrast relative to its surroundings. Accordingly, projections through the marker also have high contrast relative to neighboring projections. Alternately, a very low density material, like a hole, may also provide high contrast relative to its surroundings and produce a well-defined trajectory. If such a point exists in the object, then it can be taken as the reference point by the computing device 102, and the motion of the object may be determined by the computing device 102 via Equation (3). One potential embodiment of a method for determining a trajectory for an object in linear motion based on projections of a reference point on the object is described below in connection with FIG. 5.

In block 312, the computing device 102 determines a trajectory sum for each portion of the object. For example, the computing device 102 may determine a trajectory sum for each point (u, v) in the object frame of reference or for each discrete pixel, voxel, or other portion of the object in the object frame of reference. The trajectory sum is determined based on the sinogram data and the associated trajectory of the object. To determine the trajectory sum, in block 314 the computing device 102 calculates a line integral of filtered projection data along the object trajectory in the sinogram space.

The trajectory sum for a portion of an object may be determined by the computing device 102 for a particular point of interest on the object. The point of interest may be the reference point at the origin of the reference frame of the object or any other point on the object. As described above, the sampled projection angle $\theta_t$ is indexed by t, as are the coordinates in object space $(x_t, y_t)$ of the point of interest. That indexing carries over to the rotated space $(\xi_t, \eta_t)$ as shown in Equation (5), below. One consequence of this relationship is that $(\xi_t, \eta_t)$ are both an explicit and implicit function of $\theta_t$. Equation (5) shows the explicit functionality. The implicit functionality come through the functions $x_{t(\theta)}$ and $y_{t(\theta)}$.

$$\begin{pmatrix} \xi_t \\ \eta_t \end{pmatrix} = \begin{pmatrix} \cos\theta_t & \sin\theta_t \\ -\sin\theta_t & \cos\theta_t \end{pmatrix} \begin{pmatrix} x_t \\ y_t \end{pmatrix} \quad (5)$$

The point of interest $(x_t, y_t)$ traces a trajectory $\xi_t(\theta_t)$ in the sinogram space. Since each quantity, x, y, $\theta$, the projection location $\xi$, and the projection value p are well defined, the trajectory $\xi_t(\theta_t)$ is well defined for each time index t. In the sinogram space, the trajectory for a moving point is functionally different than a stationary point's trajectory. As described above, a stationary object point maps to a sine wave trajectory, but a moving object point maps to a more complex trajectory. The disclosed reconstruction methodology performed by the computing device 102 for a moving trajectory includes the addition of the time index and the change of the object function to the moving frame of reference, $f$ to $f_0$, as shown in Equation (6), below. Stated in words, this equation has the following meaning. Each point of interest or other portion of the object follows a trajectory $\xi_t(\theta_t)$ in the sinogram space. Taking the sum of h*p along this trajectory allows the computing device 102 to recover the value of $f_0(u, v)$. As shown in Equation (7), h is a symbolic function defined by its convolution mapping with p. Conceptually, the Fourier Transform of h is $|\omega|$. The symbolic function h is applied as a filter (e.g., a ramp filter) on the sinogram space. The methodology of taking the projection along the point of interest's trajectory in the sinogram space may be applied by the computing device 102 to parallel projections, fan beam projections, cone beam projections, or any other projection geometry. Summing the projection along the trajectory in the sinogram space may have particular advantages for certain projection geometries. For example, with a cone beam projection geometry, the point of interest may be tracked for a full rotation in the x, y, and z directions, which may improve reconstruction as compared to a standard CT. In particular, with cone beam projection, the trajectory sum may be calculated for certain points that may not be tracked by a standard CT (e.g., points that move off of a slice during a scan).

$$f_0(u,v) = \int_0^\pi (h*p)(\theta_t, \xi_t) d\theta_t \quad (6)$$

$$(h*p)(\theta, \xi) = \int_{-\infty}^{\infty} |\omega| \hat{p}(\theta, \omega) e^{2\pi i \omega \xi} d\omega \quad (7)$$

The reconstruction methodology for a moving object shown in Equation (6) may be proven by starting with the proof for a stationary object, followed with additional care taken to consider the implicit dependencies on $\theta$ introduced by the time variable. It should be appreciated that the complexity of the object's motion path is not a consideration in the proof of Equation (6). Accordingly, when the trajectory of a reference point through the sinogram space is known by the computing device 102, the computing device 102 can compute the projection in the sinogram space and, thus, the corresponding trajectory sum.

As described above, the computing device 102 may determine a trajectory sum for each point or other portion of the object in a moving frame for a rigid body in translational motion. Again, as discussed above, the object may move in one of several different ways. For example, the object may exhibit rotation. In such cases, the rigid body can be rotated about any point in the plane, but without loss of generality the reference point that was the origin in the frame of reference of the body can be chosen as the pivot point. The rotated frame of reference is described by a rotation angle $\psi_t$ and a point of interest at (u, v) in the object's reference frame that satisfies:

$$\begin{pmatrix} x_t \\ y_t \end{pmatrix} = \begin{pmatrix} \cos\psi_t & -\sin\psi_t \\ \sin\psi_t & \cos\psi_t \end{pmatrix} \begin{pmatrix} u \\ v \end{pmatrix} \quad (8)$$

$$f(x_t, y_t) = f_0(u, v) \quad (9)$$

That is, rotating the object by $\psi_t$ is equivalent to rotating the coordinate system by $-\psi_t$. Notice that $\psi_t$ is a signed quantity so rotations in either direction are possible.

Next, the sampling angle $\theta_t$ for projections is introduced. The trajectory of the point of interest in the sinogram space is again well defined, but it depends on the difference $$\varepsilon_t = \theta_t - \psi_t \quad (10).$$

Projections at the point of interest only depend on the angle between the $\xi$-axis and the vector to the point of interest. If the plane were rotated by $-\psi_t$, then in effect the object has been transformed back into the frame of reference for object and the projection relates to the stationary object projection $$p(\theta_t, \xi_t) = p_0(\varepsilon_t, \xi_t) \quad (11).$$

This means a rotated object can be treated by the computing device 102 like a stationary object but with the sampling angle $\varepsilon_t$ instead of $\theta_t$. If we consider a sinogram space defined by $(\varepsilon_t, \xi_t)$ then $$f_0(u,v) = \int_0^\pi (h * p_0)(\varepsilon_t, \xi_t) d\varepsilon_t \quad (12).$$

It should be appreciated that the $\delta$ variable and the projection $p_0$ are used in Equation (12). To translate this into the lab frame of reference (e.g., the stationary frame of reference of the CT scanner 104), Equation (12) becomes $$f(x_t, y_t) = \int_0^{\pi + \psi_\tau} (h * p)(\theta_t, \xi_t) d\theta_t \quad (13).$$

The above equation assumes at time $t=0$, $\psi_0=0$ which means $\varepsilon_0=0$ and that at time $t=\tau$, $\varepsilon_\tau=\pi$. Notice it is possible that $\varepsilon$ never reaches $\pi$. For example, if the object rotates at the same angular speed as the source, then the source 140 will never complete a half rotation around the object. A related situation is when the object rotates only slightly slower than the source 140. In that situation, the $\varepsilon_t$ reaches $\pi$ eventually, but in practice the CT scanner 104 only performs one full rotation to image an object. If the source 140 has not completed a half rotation around the object before the scanner 104 has completed one full rotation, then the data would be incomplete. Thus, to image the entire object, the computing device 102 may extend or truncate the projection through the sinogram spaces to the point where $\varepsilon = \pi$.

Still referring to FIG. 3, in block 316, the computing device 102 images the object in its initial time position using trajectory sums determined as described above in connection with block 312. For example, the image may be embodied as a grayscale digital image, and each pixel value may represent a trajectory sum for a particular point (u, v) or other portion of the object. As described above, the trajectory sums are determined in the frame of reference of the moving object, and the reconstructed image is located at the original position of the object at the initial time index. After generating the image, the computing device 102 may display the image using the display 130 or otherwise process the image. After imaging the object, the method 300 loops back to block 302, in which the system 100 may scan additional objects.

Figure 5:
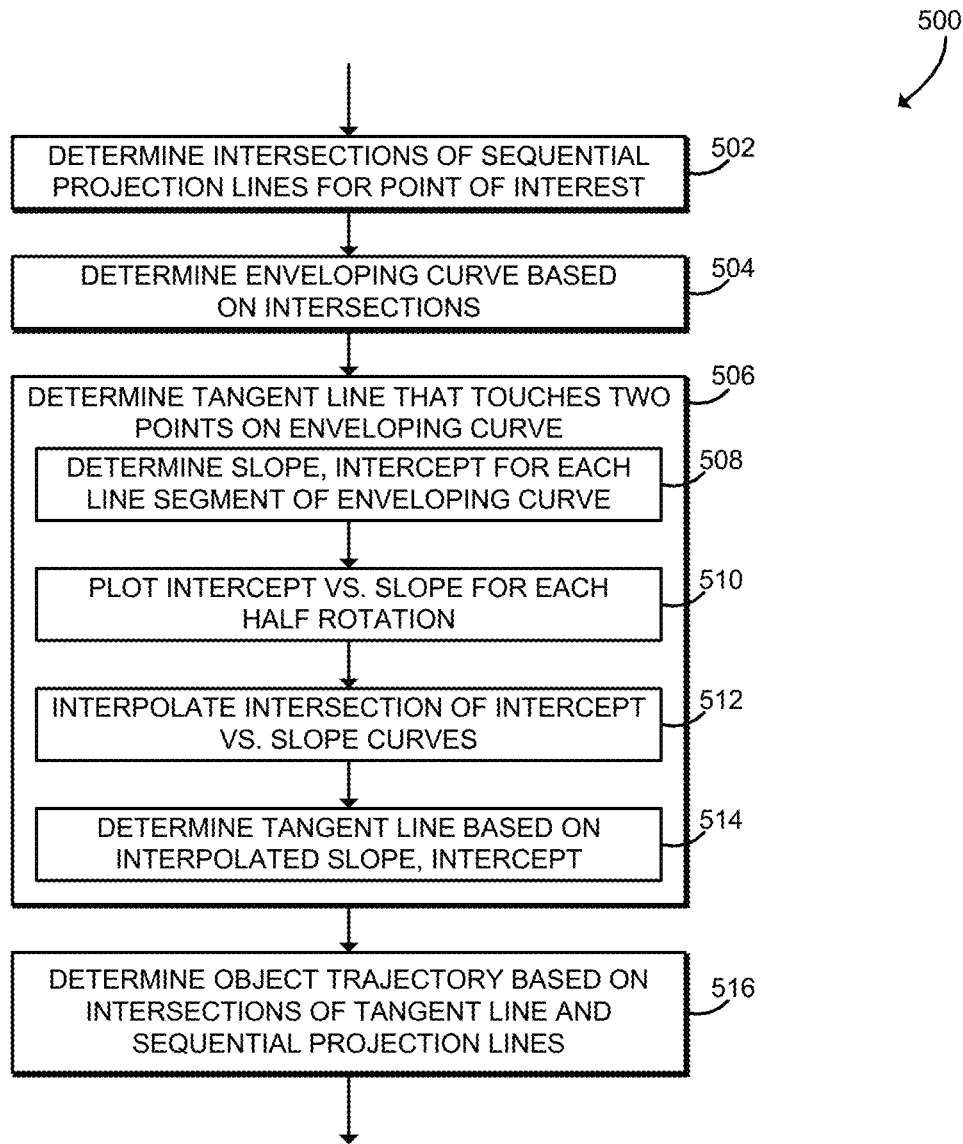
FIG. 5 is a simplified flow diagram of at least one embodiment of a method for linear motion detection that may be executed by the system of FIGS. 1 and 2.

Referring now to FIG. 5, in use, the computing device 102 may execute a method 500 for linear motion detection. It should be appreciated that, in some embodiments, the operations of the method 500 may be performed by one or more components of the environment 200 of the computing device 102 as shown in FIG. 2. The method 500 begins with block 502, in which the computing device 102 determines a set of intersections of sequential projection lines for a point of interest on the object. The point of interest may be any particular location (u, v) on the object and may coincide, for example, with a fiducial marker attached to the object, a location of high contrast on the object, or other predetermined location on the object. The point of interest may be the same reference point used to define the frame of reference of the object as described above, or may be a different location on the object. As described above, the CT scanner 104 scans the object through a full rotation of sampling angles, with each sampling angle at a different time index. At each angle (and, thus, at each time index), a particular projection line intersects the point of interest. There is one and only one projection through a given point at each projection angle $\theta_t$, so the projections are a sequence of lines in time that mark the progress of the point $(x_t, y_t)$. If the given point should happen to be stationary, then all the projections lines intersect through that single point (x, y). This changes as soon as the point of interest moves. When the point of interest moves, each pair of adjacent projection lines may intersect at different points. The set of projection intersections include each intersection between adjacent projection lines.

In block 504, the computing device 102 determines a cardioid-like enveloping curve based on the set of projection intersections. As described above, for a moving point of interest, intersections of adjacent projection lines form an enveloping curve in a cardioid-like shape. The size of the curve depends on the extent of the motion, but the form does not. For example, the curve does not disappear by increasing the speed of rotation of the source 140. This increased speed may shrink the curve, but the curve does not vanish entirely (given sufficient measurement resolution). The enveloping curve may be defined by a set of line segments, with each line segment in turn defined by a pair of adjacent projection intersections. The enveloping curve includes two lobes, and each lobe is associated with a half-rotation of the CT scanner 104.

In block 506 the computing device 102 determines a tangent line that touches the enveloping curve at exactly two points. As described further below, the motion path of the point of interest on the object lies along the determined tangent line. For a stationary object, the point of interest of the object appears at the intersection of adjacent projection lines. However, for a set of source 140 positions in adjacent time steps and associated projection lines, there is no unique solution for the point of interest on a moving object. For example, if the object is moving in some sense parallel to the direction that the source 140 is moving, then the object may be between the source 140 and the intersection of adjacent projection lines; but if the object is moving antiparallel to the source 140, then the intersection may be located between the source 140 and object. It is possible for these two examples to have the same projection lines and hence same intersection point.

Although it appears there may be an infinite number of solutions, the shape of the projection curves and the motion path of the object are related and in the special case that the object moves in a linear path, an exact solution for the point of interest on a moving object exists. As described above, when the source 140 and the object move in some sense parallel to each other, the intersection point of adjacent projections is to the outside of the source 140 and object, and when the source 140 and object move anti-parallel to each other, the intersection is between the object and source 140. When the object is moving along the projection line of the source 140 (i.e., neither parallel nor anti-parallel), the intersection point of adjacent projections is coincident with the object. More precisely stated, the object path is tangent to the intersection path. It should be appreciated that the above-described relationship is consistent in the differential limit and is also consistent in the discrete limit whenever the motion of the object is along the projection line of the source 140.

Based on this relationship, if the motion path of the object is linear, then the computing device 102 can find the motion path, because for a full 360° rotation of the source, the motion of the object is along the projection line of the source 140 exactly twice. This means that there are two points on the enveloping curve that have the same tangent line and these two points are sufficient to uniquely identify a line (i.e., the path). In particular, the computing device 102 may determine the location of the object point of interest on this tangent line at time step t as the intersection of the projection line associated with t and the tangent line. The collection of these intersections gives the discrete set of positions of the point of interest of the object as a function of time. It should be appreciated that this solution for the motion does not depend on the complexity of the motion on the line. Additionally, in practice many CT scanners 104 perform a full rotation on the order of a second. Many objects move relatively slowly to this in comparison and thus the object path during the scan will be approximately linear.

In some embodiments the computing device 102 may interpolate or otherwise approximate the tangent line based on discrete measurements taken at each sampling angle. The tangent line may be determined exactly if the source 140 happens to be aligned collinearly to the object during a particular measurement, although this is not likely to happen in most scans due to discrete sampling. In most scans, the angle between the source 140 projection line and the object motion will be nearly equal to 0° or 180° but slightly off. The computing device 102 addresses this by analyzing the collection of intersection points $I_j$ of adjacent projections and the line segments connecting those intersection points. To determine the tangent line, the computing device 102 may identify two line segments of the enveloping curve that fall on the same line (or approximately the same line). In block 508, the computing device 102 determines a slope-intercept pair for each line segment of the enveloping curve. Each successive pair of intersections $I_j$ and $I_{j+1}$ forms a line segment with a slope and intercept $(m_j, b_j)$. A space of slopes and intercepts is considered and successive points $(m_j, b_j)$ and $(m_{j+1}, b_{j+1})$ are connected. In block 510, the computing device 102 plots intercept versus slope for the line segments of each half-rotation. For example, the computing device 102 may plot a curve for line segments included in one lobe of the enveloping curve and may plot another curve for line segments included in another lobe of the enveloping curve. In block 512, the computing device 102 interpolates the intersection of those intercept-slope curves. At the intersection of those intercept-slope curves, the corresponding line segments from each lobe of the enveloping curve have the same (or approximately the same) slope and intercept and, thus, fall on the same line. In block 514, the computing device 102 determines the tangent line based on the interpolated slope and intercept. In other words, the tangent line is defined by the interpolated slope and intercept.

After determining the tangent line, in block 516 the computing device 102 determines the motion path for the point of interest on the object based on the intersections of the tangent line and the sequential projection lines. In particular, and as described above, the intersection of a particular projection line and the tangent line provides the location of the point of interest on the object at the time index associated with that projection. Thus, the complete path of the object may be determined through the complete rotation. After determining the motion path, the method 500 is completed. The motion path may be used to determine a corresponding trajectory in sinogram space, as described above. The method 500 may be repeated to determine motion paths for additional objects.

Figure 6:
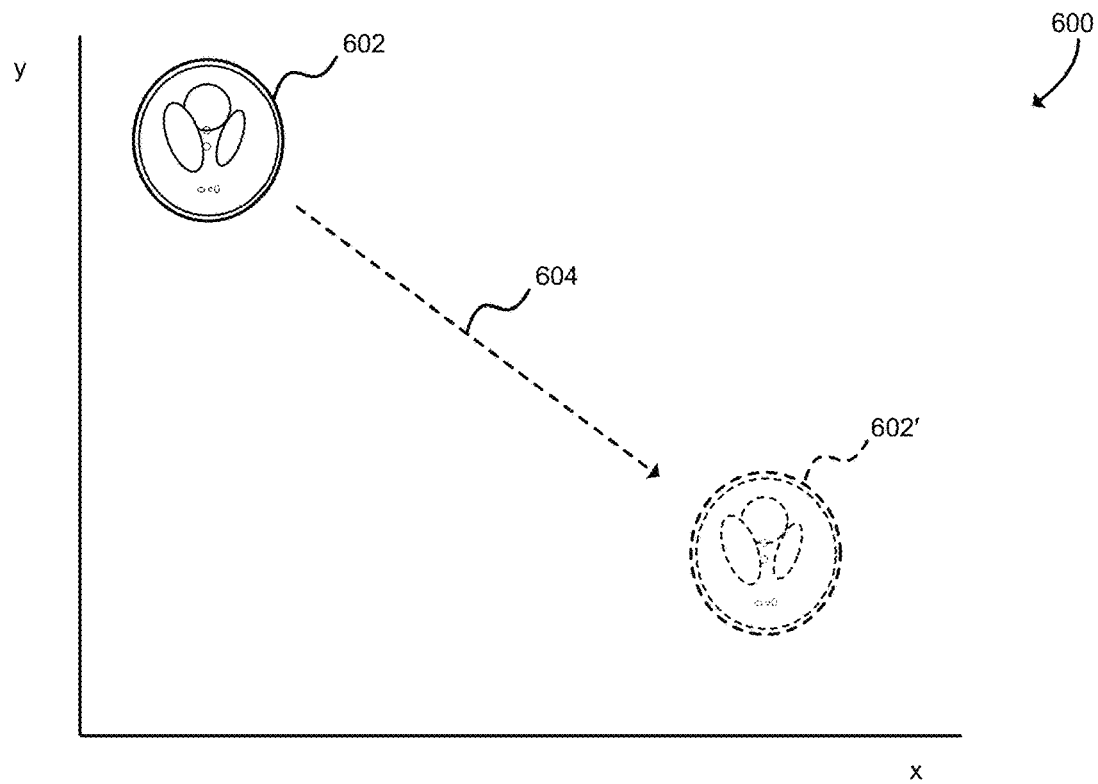
FIG. 6 is a schematic diagram illustrating a sample moving object that may be imaged by the system of FIGS. 1-2.

Referring now to FIG. 6, schematic diagram 600 shows an illustrative moving object 602 that may be imaged by the system 100. The object 602 is illustrated in a two-dimensional (x, y) plane. As shown, the object 602 moves along a linear motion path 604 from its initial position to a final position 602'. The CT scanner 104 may capture projections of the object 602 as it moves along the motion path 604.

Figure 7:
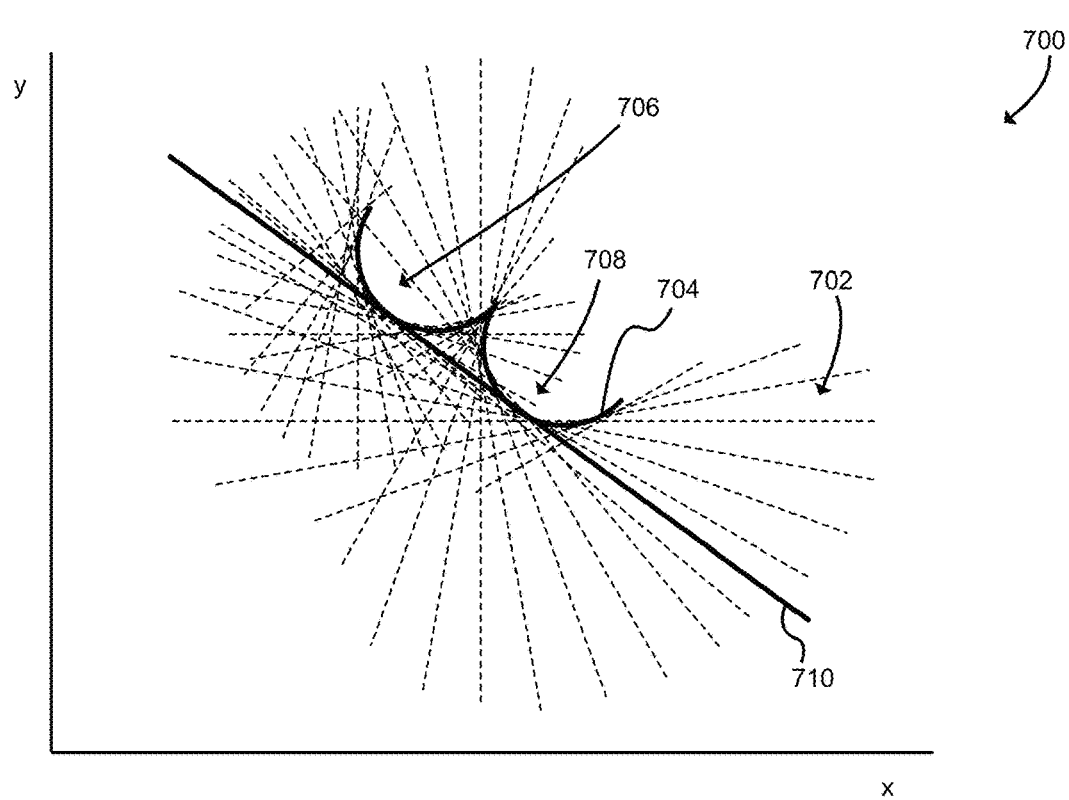
FIG. 7 is a plot illustrating projection lines that may be used to detect linear motion in connection with the method of FIG. 5.

In some embodiments, the motion path 604 may be determined based on captured projection data, for example using the method described above in connection with FIG. 5. Referring now to FIG. 7, plot 700 illustrates a graphical solution to the method 500 as applied to motion of the object 604. The plot 700 includes multiple, sequential projection lines 702. Each projection line 702 represents a line at a particular sampling angle $\theta_t$ that passes through a particular point of interest (u, v) on the object 602. Although illustrated as sampling the object 602 at 10-degree intervals, it should be understood that the scan data may include additional or fewer sampling angles and thus the plot 700 may include additional or fewer projection lines 702. Each sequential pair of projection lines 702 intersect at a point, and those intersections define a cardioid-like enveloping curve 704. The enveloping curve 704 is divided into two lobes 706, 708, with each lobe 706, 708 representing a half-rotation of the CT source. For example, lobe 706 may be defined by projection lines 702 for sampling angles from zero to 180 degrees, and lobe 708 may be defined by projection lines 702 for sampling angles from 180 degrees to 360 degrees. A tangent line 710 touches the curve 704 at two points. As described above, the tangent line 710 describes the motion path of the object 602. For each time step t, the point of interest on the object 602 is located at the intersection of the tangent line 710 and the projection line 702 for the corresponding sampling angle $\theta_t$.

Figure 8:
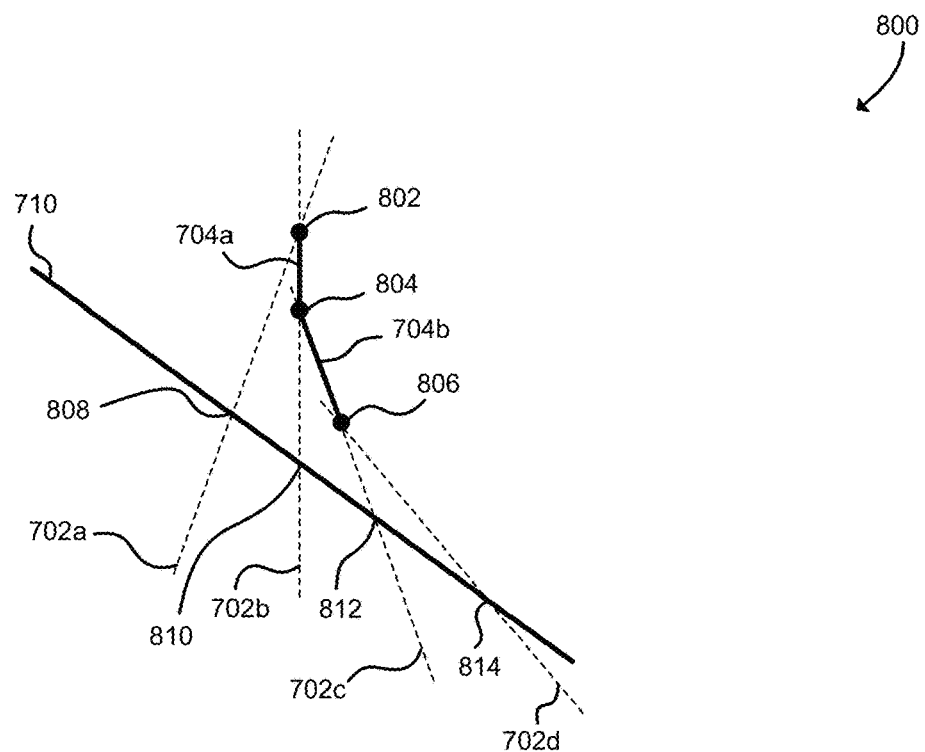
FIG. 8 is a detail view of the plot of FIG. 7.

Referring now to FIG. 8, diagram 800 illustrates part of the plot 700 in detail. In particular, the diagram 800 illustrates four sequential projection lines 702a, 702b, 702c, 702d. Those four projection lines 702 intersect at three projection intersections 802, 804, 806. In particular, projection lines 702a, 702b intersect at intersection 802, projection lines 702b, 702c intersect at intersection 804, and projection lines 702c, 702d intersect at intersection 806. As described above, the intersections 802, 804, 806 define multiple line segments that form the enveloping curve 704. In particular, a line segment 704a is defined between intersections 802, 804, and a line segment 706b is defined between intersections 804, 806.

Also shown in FIG. 8 is the tangent line 710. As described above, the object path 604 is described by intersections between the sequential projection lines 702 and the tangent line 710. Illustratively, the point of interest of the object 602 is sequentially located at intersections 808, 810, 812, 814 between the projection lines 702a, 702b, 702c, 702d and the tangent line 710, respectively. This means that the point of interest of the object 602 is located at the corresponding intersection 808, 810, 812, 814 at the time index for the sampling angle $\theta_t$ associated with the respective projection line 702a, 702b, 702c, 702d.

Figure 9:
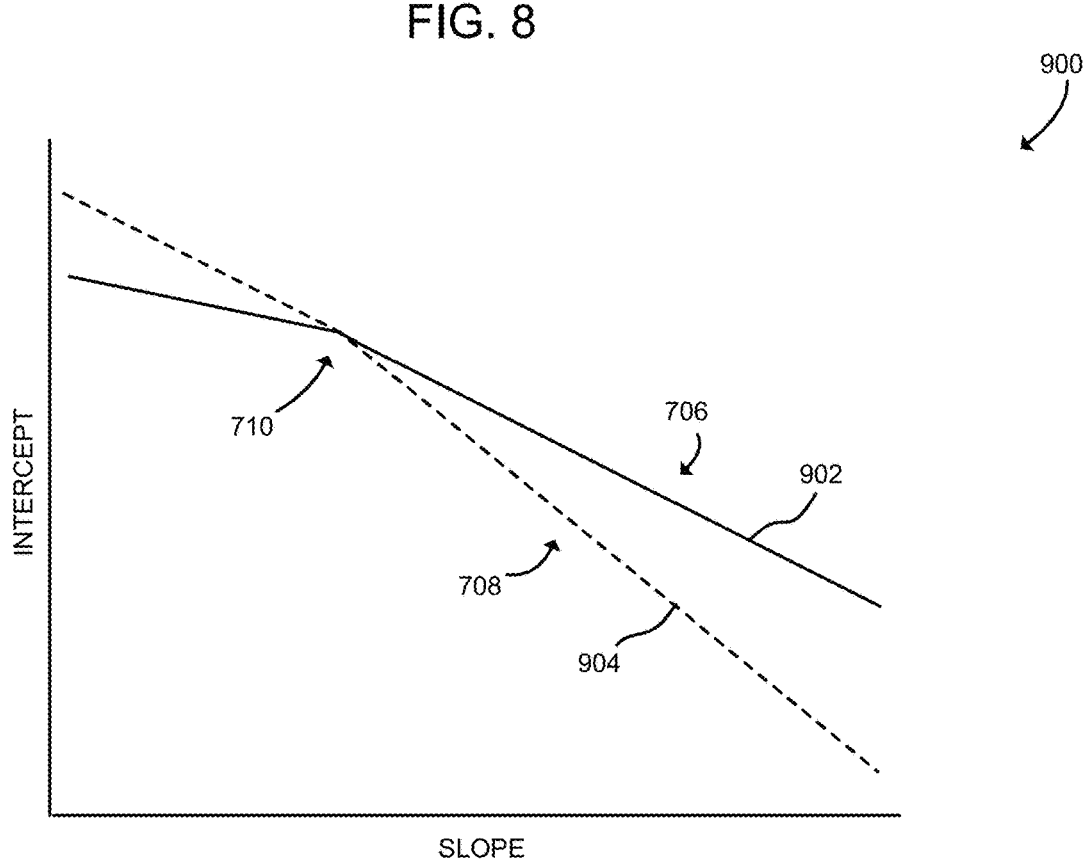
FIG. 9 is a plot of slope versus intercept that may be used to detect linear motion in connection with the method of FIG. 5.

Referring now to FIG. 9, plot 900 illustrates a slope-intercept space that may be used to approximate the tangent line 710. As described above, a slope-intercept pair for each line segment of the enveloping curve 704 may be determined. The slope-intercept pairs may be mapped in a two-dimensional slope-intercept space as shown in the plot 900. The plot 900 includes a curve defined by slope-intercept pairs for each half-rotation of the source. Illustratively, the plot 900 includes a curve 902 associated with the lobe 706 and a curve 904 associated with the lobe 708. The curves 902, 904 intercept at the tangent line 710 (which may be interpolated between sampling angles).

Figure 10:
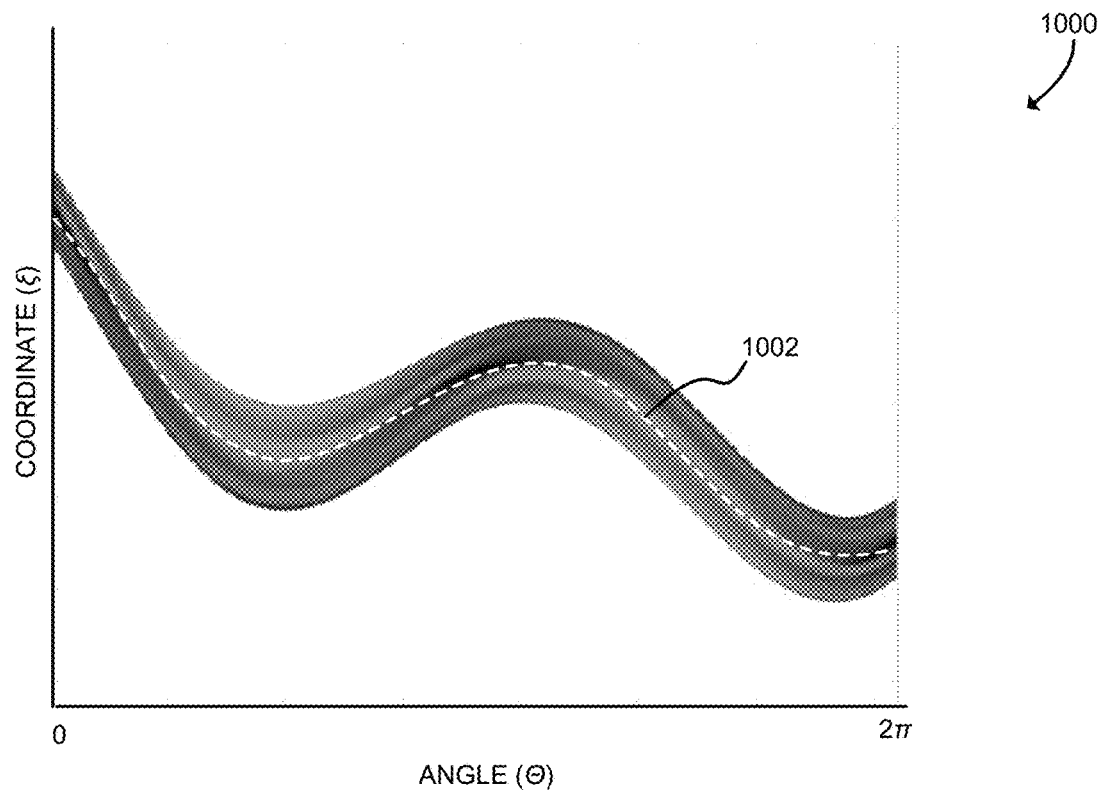
FIG. 10 is a plot illustrating sinogram data of a moving object that may be captured by the system of FIGS. 1-2.

Referring now to FIG. 10, sinogram data 1000 is captured by the CT scanner 104 for the moving object 602. As shown, the sinogram data 1000 plots projection coordinate against sampling angle θ. The projection values p sampled by the scanner 104 for each projection angle θ are illustrated as inverted grayscale pixels at the corresponding (θ, coordinates. A sample trajectory 1002 associated with a point of interest in the object 602 is highlighted with a dashed line in the plot 1000. Other points of interest in the object 602 are similarly associated with trajectories in the sinogram data 1000. As described above, a trajectory sum may be determined for each trajectory 1002 included in the sinogram data 1000. As shown, because the object 602 is in motion, the trajectory 1002 is non-sinusoidal. Accordingly, traditional CT image reconstruction (e.g., typical filtered back projection) is not capable of reconstructing a clear image from the sinogram data 1000.

Figure 11:
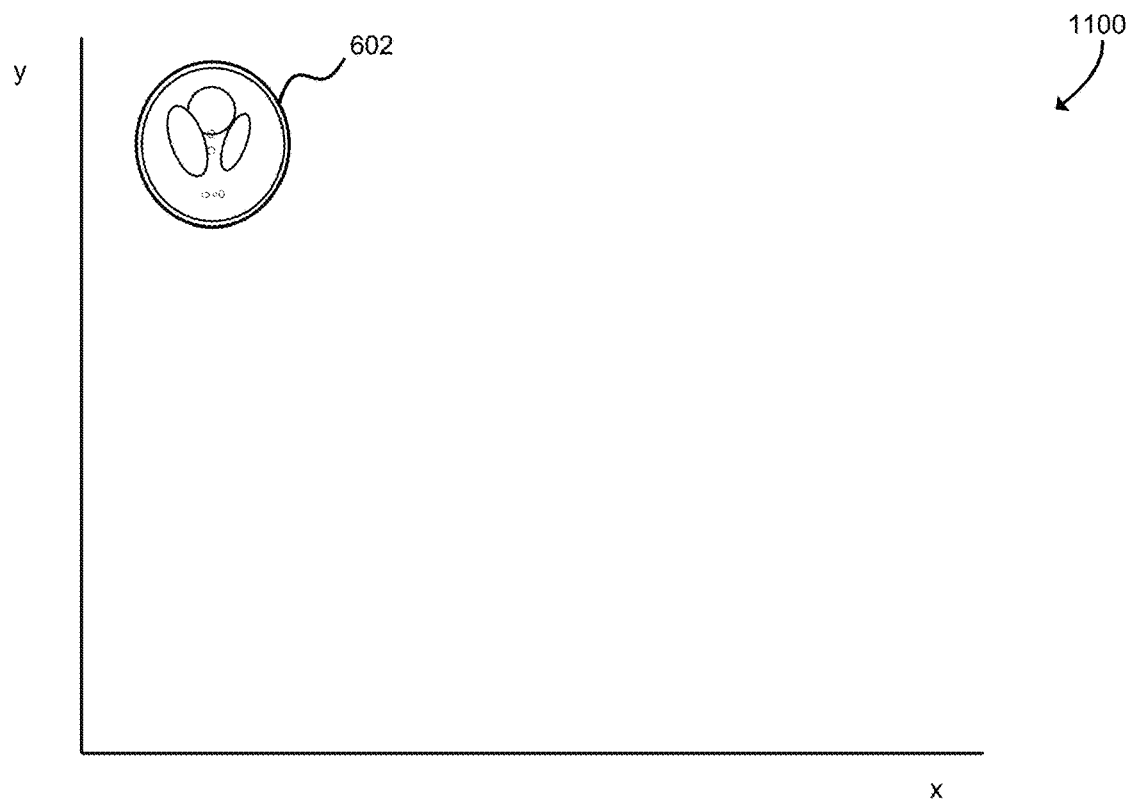
FIG. 11 is a schematic diagram of an image of a moving object that may be recovered in connection with the methods of FIGS. 3 and 5.

Referring now to FIG. 11, diagram 1100 illustrates an image of the object 602 that may be reconstructed from the sinogram data 1000 shown in FIG. 10 using trajectory data determined as shown in FIGS. 7-9. Each point (u, v) of the object 602 may be determined as the trajectory sum of a corresponding trajectory in the sinogram data 1000 using Equation (6), as described above. Of course, in many embodiments the image may be a discrete digital image including multiple pixels, and a trajectory sum may be determined for each pixel rather than for each point in the object. The trajectory sums are determined in the frame of reference of the moving object 602. Accordingly, the image in the diagram 1100 shows the object 602 in its initial position.

Figure 12:
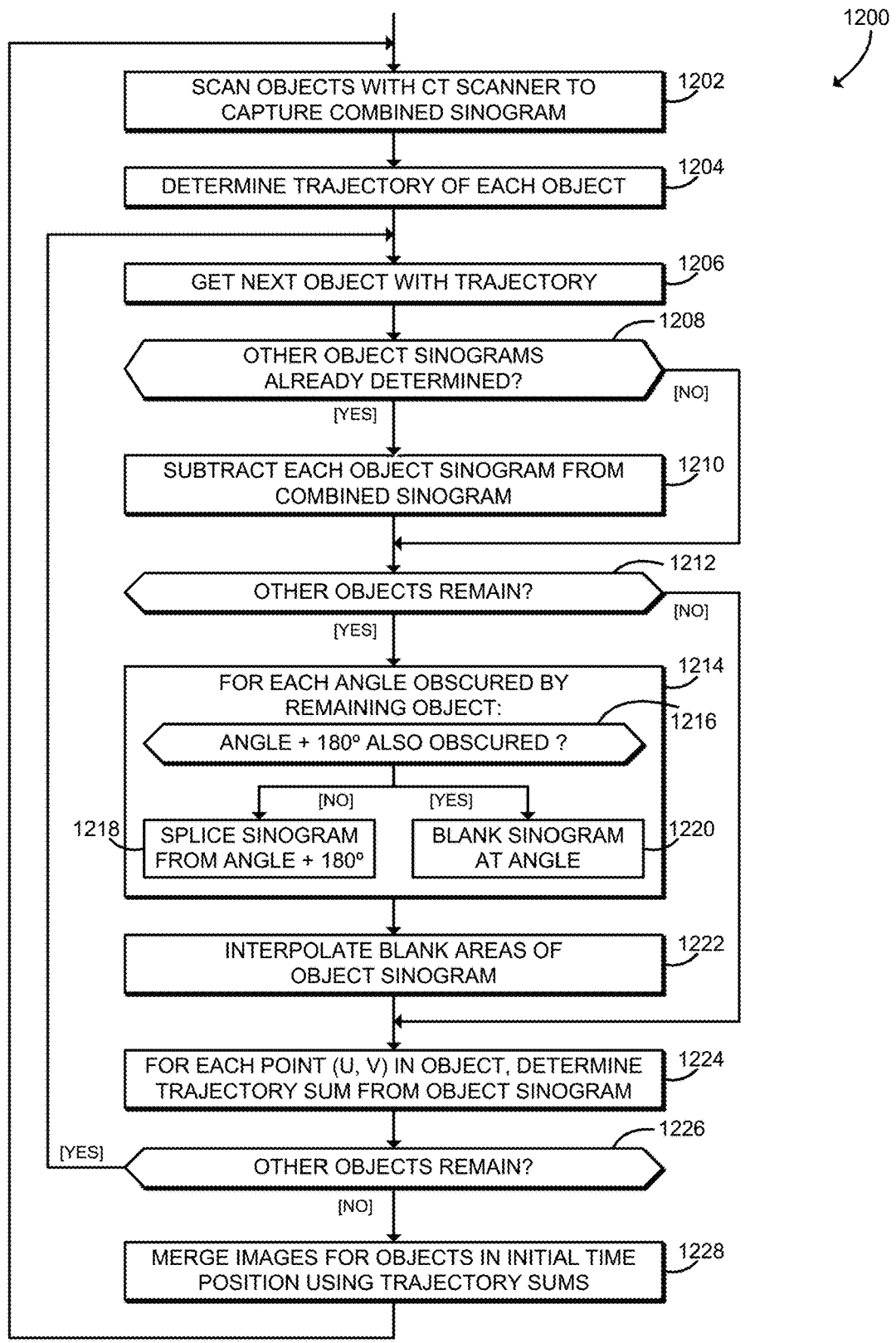
FIG. 12 is a simplified flow diagram of at least one embodiment of a method for CT image reconstruction of multiple objects that may be executed by the system of FIGS. 1 and 2.

Referring now to FIG. 12, in use, the computing device 102 may execute a method 1200 for image reconstruction of multiple stationary and/or moving objects. It should be appreciated that, in some embodiments, the operations of the method 1200 may be performed by one or more components of the environment 200 of the computing device 102 as shown in FIG. 2. The method 1200 begins with block 1202, in which the computing device 102 scans multiple objects using the CT scanner 104 to capture combined sinogram data 212. As described above, the CT scanner 104 sweeps through multiple sampling angles, and at each sampling angle captures multiple projections. Thus, time is an index for the position $(x_t, y_t)$ of a moving object and for each sampling angle $\theta_t$. As described above, the scanned objects may be moving or stationary. Two situations suggest themselves when considering moving and stationary objects together. In one situation, there may be multiple objects moving about. These may or may not interact but may not intersect or otherwise occupy the same space at the same time. The other situation considers the problem of an object moving through a fluid. The fluid will be displaced by the object, but the fluid will not appear to move and from the reconstruction concept can be thought of as stationary.

In block 1204, the computing device 102 determines a trajectory for each scanned object. As described above, the trajectory describes a path of a reference point on the corresponding object in the sinogram space, and the motion path of each point in object space corresponds to a curve in the sinogram space. The computing device 102 may use any appropriate technique to determine the trajectory of the object. For example, as described above, the computing device 102 may use a predetermined trajectory, the computing device 102 may determine the trajectory using a computational model of the object, or the computing device 102 may determine the trajectory based on the sinogram data captured by the CT scanner 104. In some embodiments, the computing device 102 may determine a trajectory for one or more moving objects using the method 500 described above in connection with FIG. 5.

In block 1206, the computing device 102 gets the next scanned object with its associated trajectory. In block 1208, the computing device 102 determines whether object sinograms associated with other scanned objects have already been determined, for example in previous iterations of the method 1200. As described further below, an object sinogram includes sinogram data associated with a single object that is generated or otherwise extracted from the combined sinogram. If no other object sinograms have been previously determined, the method 1200 branches ahead to block 1212. If an object sinogram has been previously determined, the method 1200 advances to block 1210.

In block 1210, the computing device 102 subtracts each object sinogram that has been determined previously from the combined sinogram. Subtracting each object sinogram removes the sinogram data associated with the previously determined sinogram from the combined sinogram. After subtraction, sinogram data associated with the current object—and any other objects not yet processed—remains, for example in a buffer or other working space.

In block 1212, the computing device 102 determines whether additional objects other than the current object remain to be processed. If no additional objects remain, then the current working sinogram data (e.g., after subtraction of other object sinograms) is associated with the current object and no other objects. If no additional objects remain, the method 1200 branches ahead to block 1224. If additional objects remain, the method 1200 advances to block 1214.

In block 1214, the computing device 102 processes each angle in the sinogram data in which the current object is obscured by another, remaining object. For example, the computing device 102 may determine that the current object is obscured by another object by comparing the trajectories associated with each object. In block 1216, the computing device 102 determines whether the current object is also obscured at the obscured angle plus 180 degrees (i.e., at an anti-parallel angle that is one half-rotation away from the obscured angle). If the angle plus 180 degrees is not obscured, the method 1200 branches to block 1218, in which the computing device 102 splices sinogram data from the obscured angle plus 180 degrees into the sinogram at the obscured angle. Sinogram splicing is based on the relationship $$p(\theta,-\xi)=p(\theta,\xi) \quad (14).$$

The relationship shown in Equation (14) is the case for static projections (i.e., for stationary objects). A similar but more complex relationship applies to a moving object. Suppose the moving object is not rotating. The point of interest moves on a path $(x_t, y_t)$, and the projection is at $$\xi_t=x_t\cos\theta_t+y_t\sin\theta_t \quad (15).$$

Some time later, illustratively at time τ, the projections are a half-rotation around and at position $$\xi_\tau=x_\tau\cos\theta_\tau+y_\tau\sin\theta_\tau \quad (16).$$

Because the projections are rotated by a half-rotation, the angles are related:

$$\theta_\tau=\theta_t+\pi \quad (17),$$

but the coordinates (ξ) are not related:

$$\xi_\tau = x_\tau \cos(\theta_t + \pi) + y_\tau \sin(\theta_t + \pi) = -x_\tau \cos\theta_t - y_\tau \sin\theta_t. \quad (18)$$

This coordinate is not quite $-\xi_t$ because of the change in position. Nevertheless, the two projections are anti-parallel to each other, and $$p(\theta_\tau, \xi_\tau) = p(\theta_t + \pi, \xi_\tau) = p(\theta_t, \xi_t) \quad (19).$$

Equation (19) is the same as Equation (14) because, for stationary points, this holds: $\xi_\tau = -\xi_t$.

The relationship shown in Equations (14) and (19) gives a recipe for replacing points that are obscured by the moving object at one angle but not at the projection taken a half-rotation over and after "flipping" the axis. For example, for a stationary object, if the projection at $(\theta, \xi) = (-1, 2)$ is obscured, that point can be replaced by the point at $(\theta+\pi, -\xi) = (-1+\pi, -2)$. Additionally or alternatively, this relationship may be used to remove aliasing in the rotation sampling. A particular CT scanner may attempt to remove aliasing by introducing a ¼ detector offset, which amounts to a ½ detector difference for positions that are a half rotation apart. However, Equations (14) and (19) use exact parallel opposed projections to splice the sinograms. Thus, for CTs including a detector offset, splicing may include interpolating projections.

Additionally or alternatively, in some embodiments, filtered back-projection may use a half rotation that is clear of the effects of other objects. This is a concept that can be applied on a pixel-by-pixel basis. Each pixel in the object space maps to a sinewave trajectory in the sinogram space. The filtered-back projection theorem only requires a half rotation around the object to obtain the value of the pixel. Equation (6) does not use the orientation of the object relative to what is defined as "0" and what is defined as "π", so any half rotation may be used. If more than a half rotation is available, this additional data may be used to make multiple images and average them.

Referring back to block 1216, if the angle plus 180 degrees is obscured, the method 1200 branches to block 1220, in which the computing device 102 blanks the sinogram at the obscured angle. The computing device 102 may, for example, set each projection value in the obscured region to zero or otherwise blank the obscured region.

In block 1222, the computing device 102 interpolates blank areas of the object sinogram. As described above, each blanked region corresponds to a view of the object that is obscured from multiple views (e.g., from either side). Regions that are obscured from multiple views may relate to the size of the moving objects or, equivalently, looking at points close to the object. For example, consider a slowly moving object that is obscuring a stationary point until the last quarter rotation. In that example, there are insufficient points on the stationary pixel's trajectory to form an image of the stationary pixel, and the stationary pixel may be blocked by the moving object in both projections. The values for these regions can be zeroed and then filled in using interpolation. The interpolation process looks at input from many different trajectories. Consider a pixel in the zeroed or otherwise voided region. This pixel has coordinates $(\theta, \xi)$ which selects a particular projection line in the object space. Each point on this projection line has a trajectory (sine wave) that may be used to estimate the missing value at $(\theta, \xi)$. All of those sine wave trajectories intersect at $(\theta, \xi)$ and thus each trajectory is equally valid.

The interpolation technique then is to estimate a value for each sine wave through $(\theta, \xi)$ and then take the average over all these values. Other possible interpolation schemes may be used, such as using the median value, the minimum value or the maximum value.

In block 1224, after subtracting other object sinogram data in some embodiments, and after splicing and/or interpolating sinogram data in some embodiments, the computing device 102 determines a trajectory sum for each point (u, v) in the object frame of reference. As described above, the trajectory sum is determined based on the sinogram data and the associated trajectory of the object. To determine the trajectory sum, the computing device 102 may calculate a line integral of filtered projection data along the object trajectory in the sinogram space, as shown in Equation (6).

In block 1226, the computing device 102 determines whether additional objects remain for processing. If so, the method 1200 loops back to block 1206, in which the computing device 102 gets the next object for processing. If no additional objects remain, the method 1200 advances to block 1228.

In block 1228, the computing device 102 merges images of the scanned objects in their initial time position using the trajectory sums determined as described above in connection with block 1224. For example, as described above, each image may be embodied as a grayscale digital image, and each pixel value may represent a trajectory sum for a particular point (u, v) of the object. The merged, reconstructed image of each object is located at the original position of the corresponding object at the initial time index. The merged image may be displayed using the display 130 or otherwise processed by the computing device 102. After generating the merged image, the method 1200 loops back to block 1202 to continue scanning objects with the CT scanner 104.

Figure 13:
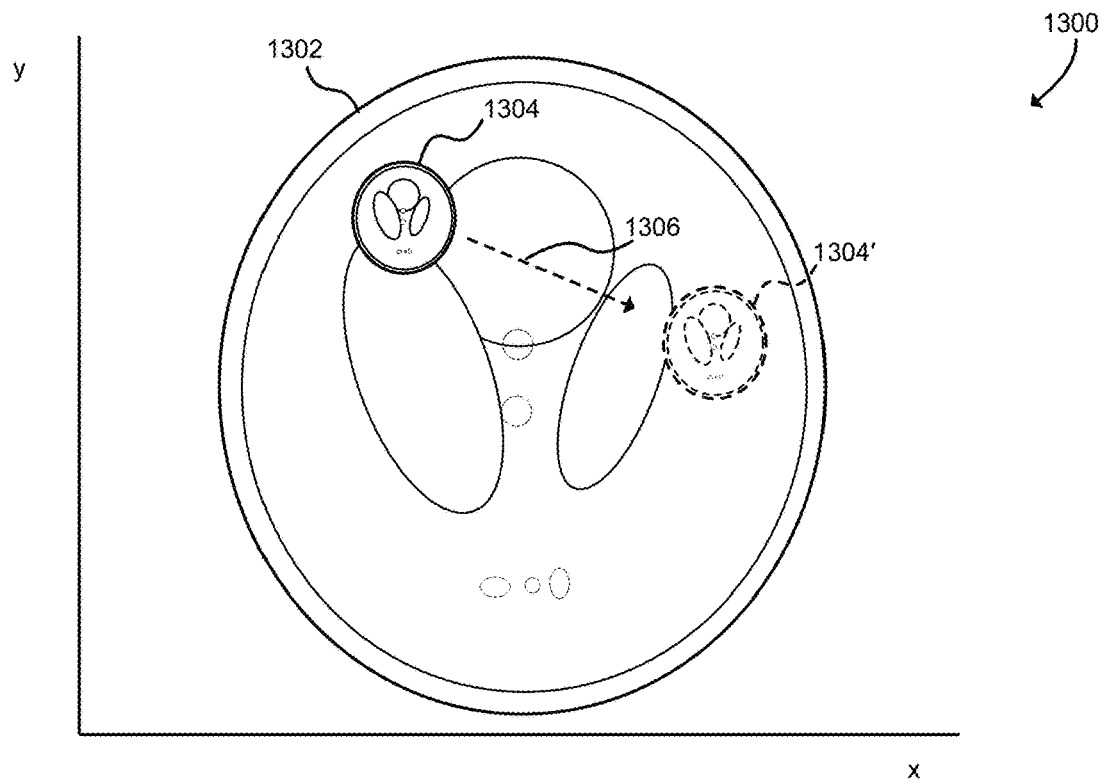
FIG. 13 is a schematic diagram illustrating a sample stationary object and a sample moving object that may be imaged by the system of FIGS. 1-2.

Referring now to FIG. 13, schematic diagram 1300 shows multiple illustrative objects 1302, 1304 that may be imaged by the system 100. Both objects 1302, 1304 are illustrated in a two-dimensional (x, y) plane. As shown, the object 1302 is stationary, and the object 1304 moves along a linear motion path 1306 from its initial position to a final position 1304'. The CT scanner 104 may capture projections of the objects 1302, 1304 as the object 1304 moves along the motion path 1306.

Figure 14:
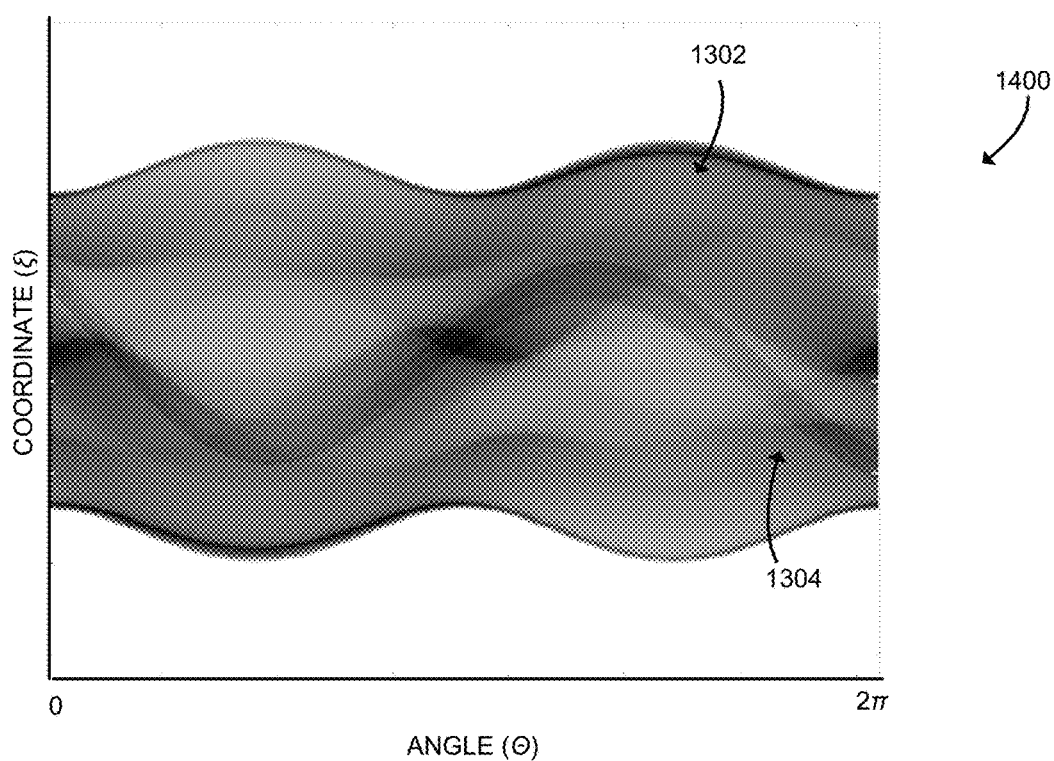
FIGS. 14-17 are plots illustrating sinogram data of multiple objects that may be processed by the system of FIGS. 1-2.

Referring now to FIG. 14, combined sinogram data 1400 is captured by the CT scanner 104 for the objects 1304, 1306. As shown, the sinogram data 1400 plots projection coordinate against sampling angle θ. The projection values p sampled by the scanner 104 are illustrated as inverted grayscale pixels at the corresponding $(\theta, \xi)$ coordinates. Illustratively, the combined sinogram data 1400 includes projections associated with the stationary object 1302 and the moving object 1304, and certain parts of the projections overlap and/or obscure each other.

Figure 15:
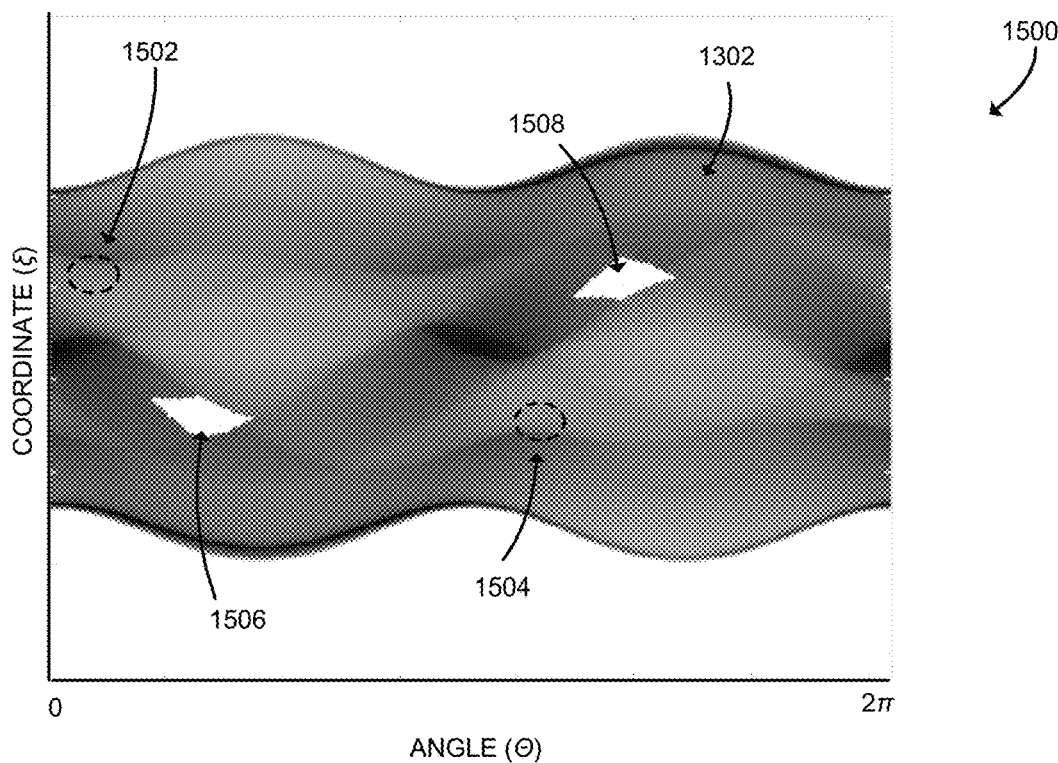

Referring now to FIG. 15, sinogram data 1500 illustrates projection data associated with the stationary object 1302 after performing sinogram slicing and/or blanking as described above in connection with blocks 1218, 1220 of FIG. 12. As shown, projection data associated with the moving object 1304 has been removed from the sinogram data 1500 by splicing and/or blanking the appropriate regions of the combined sinogram 1400. For example, an illustrative region 1502 of the sinogram data 1500 has had data spliced in from region 1504. Regions 1502, 1504 are separated by a half-rotation (i.e., by 180°), and regions 1504 is flipped on the coordinate axis as compared to region 1502 (i.e., located at $-\xi$). In the illustrative example, region 1502 was obscured by the moving object 1304, but region 1504 was not obscured. As another example, regions 1506 and 1508 have been blanked. Those regions are also separated by a half-rotation (180°), but both of those regions were obscured by the moving object 1304.

Figure 16:
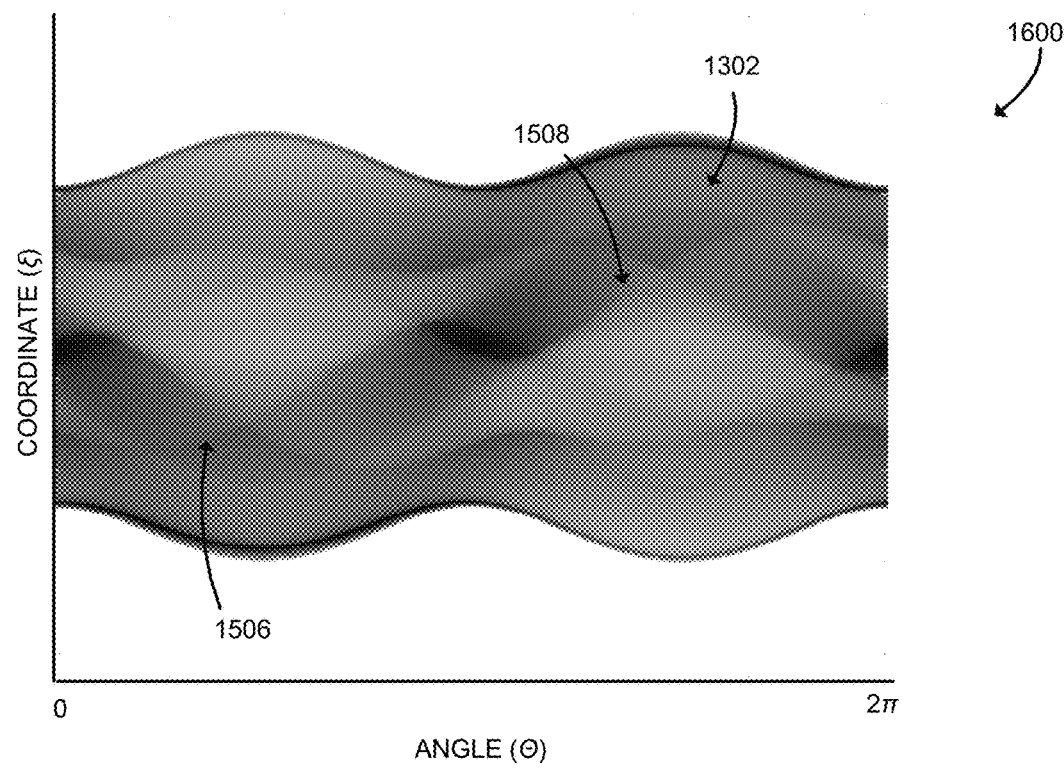

Referring now to FIG. 16, sinogram data 1600 illustrates projection data associated with the stationary object 1302 after interpolating sinogram data for blanked areas of the sinogram data 1500, as described above in connection with block 1222 of FIG. 12. As shown, both regions 1506, 1508 that are blanked in FIG. 15 are filled with interpolated sinogram data.

Figure 17:
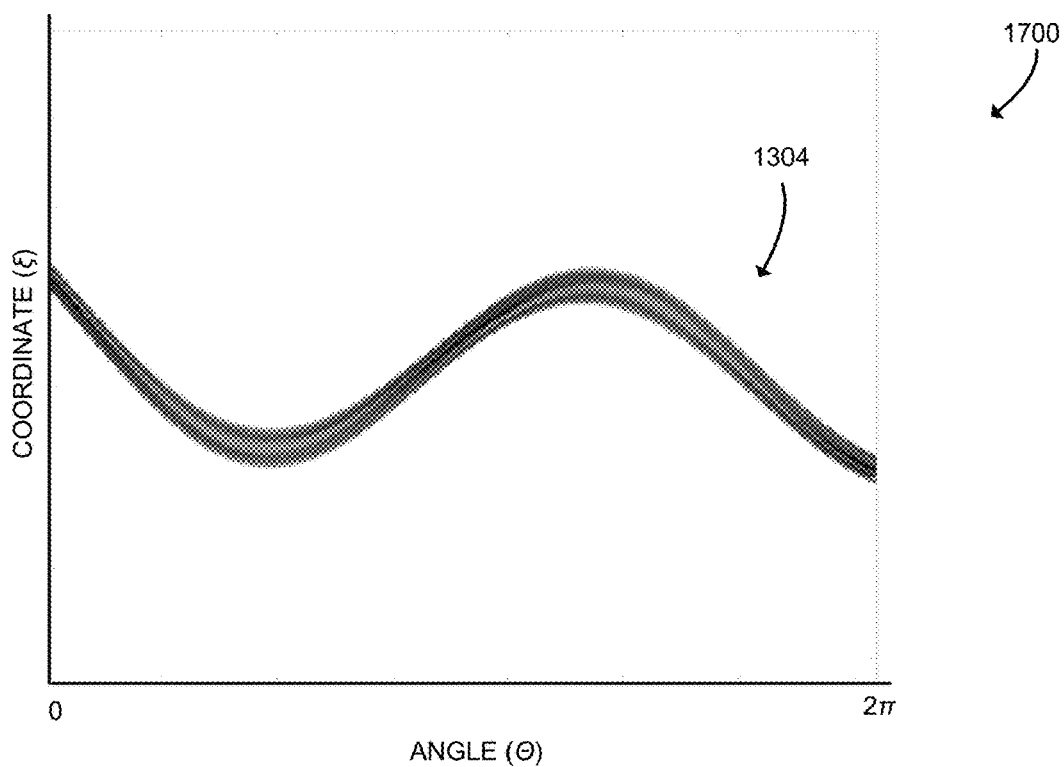

Referring now to FIG. 17, sinogram data 1700 illustrates projection data associated with the moving object 1304. The sinogram data 1700 may be produced by subtracting the sinogram data 1600 associated with the stationary object 1302 from the combined sinogram data 1400 associated with both objects 1302, 1304. In some embodiments, any blank areas in the subtracted sinogram data 1700 (e.g., areas similar to the regions 1506, 1508 that are obscured by both objects) may be filled by interpolation.

Figure 18:
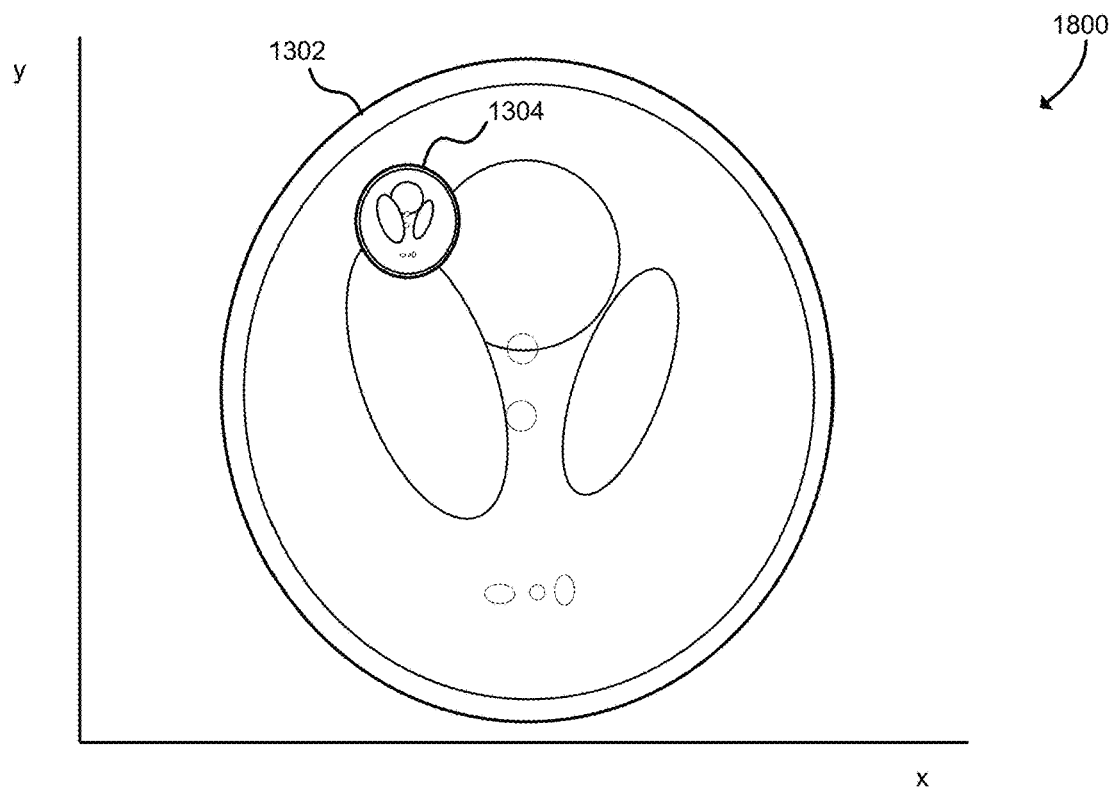
FIG. 18 is a schematic diagram of an image of a stationary object and a moving object that may be recovered in connection with the method of FIG. 12.

Referring now to FIG. 18, diagram 1800 illustrates a merged image of the objects 1302, 1304 that may be reconstructed from the sinogram data 1600 shown in FIG. 16 and the sinogram data 1700 shown in FIG. 17. In particular, each pixel of the image for the stationary object 1302 may be determined as the trajectory sum of a corresponding trajectory in the sinogram data 1600. As the object 1302 is stationary, those trajectories may be embodied as sine waves and the image may be generated through filtered back projection. Continuing that example, each pixel of the image for the moving object 1304 may be determined as the trajectory sum of a corresponding trajectory in the sinogram data 1700. As the object 1304 is moving, the trajectories in the sinogram data 1700 are not sine waves, and the trajectory sum shown in Equation (6) is used to determine the trajectory sum. As described above, those trajectory sums are determined in the frame of reference of the moving object 1304. Accordingly, the merged image in the diagram 1800 shows the object 1302 in its stationary position and the moving object 1304 in its initial position.

The invention claimed is:

1. A computing device for computed tomographic (CT) imaging, the computing device comprising:
   a scan controller to capture sinogram data indicative of a first object with a CT scanner, wherein the sinogram data comprises projection data captured by the CT scanner arranged in a sinogram space;
   a trajectory mapper to determine a first trajectory of the first object as a function of the sinogram data, wherein to determine the first trajectory comprises to: (i) determine a set of projection intersections, wherein each projection intersection is defined by an adjacent, sequential pair of projections, wherein each of the projections is associated with a point of interest of the first object, (ii) determine a curve defined by the set of projection intersections, (iii) determine a tangent line that touches the curve at two points, (iv) determine a first motion path based on intersections of the projections and the tangent line, and (v) determine the first trajectory based on the first motion path;
   a projection engine to determine a trajectory sum as a function of the sinogram data and the first trajectory, wherein the trajectory sum is associated with a portion of the first object, and wherein to determine the trajectory sum comprises to calculate a line integral of filtered projection data along the first trajectory in the sinogram space of the sinogram data; and
   an image manager to generate an image of the first object based on a determination of the trajectory sum.

2. The computing device of claim 1, wherein to determine the first trajectory comprises to select a predetermined trajectory.

3. The computing device of claim 1, wherein to determine the first trajectory comprises to determine the first trajectory with a computational model of the first object.

4. The computing device of claim 1, wherein a fiducial marker is attached to the first object.

5. The computing device of claim 1, wherein to determine the tangent line comprises to:
   determine a slope-intercept pair for each line segment of the curve, wherein the curve comprises a plurality of line segments and wherein each line segment is defined by a pair of adjacent projection intersections;
   determine a first set of slope-intercept pairs associated with a first half rotation of the curve and a second set of slope-intercept pairs associated with a second half rotation of the curve; and
   find a slope-intercept intersection between the first set of slope-intercept pairs and the second set of slope-intercept pairs;
   wherein the tangent line comprises the slope and the intercept of the slope-intercept intersection.

6. The computing device of claim 1, wherein:
   to capture the sinogram data comprises to capture sinogram data indicative of the first object and a second object;
   the trajectory mapper is further to determine a second trajectory of the second object;
   the projection engine is further to determine a second trajectory sum as a function of the sinogram data and the second trajectory, wherein the second trajectory sum is associated with a portion of the second object; and
   to generate the image comprises to generate a merged image of the first object and the second object based on a determination of the second trajectory sum.

7. The computing device of claim 6, further comprising:
   a combined motion engine to splice sinogram data from a first region of the sinogram space into a second region of the sinogram space in response to a determination of the first trajectory and the second trajectory, wherein the first region and the second region are associated with the first object and are spaced apart by a half rotation, and wherein the second region is obscured by the second object;
   wherein to determine the trajectory sum comprises to determine the trajectory sum in response to a splicing of the sinogram data.

8. The computing device of claim 7, wherein:
   the combined motion engine is further to interpolate sinogram data for a third region of the sinogram space and a fourth region of the sinogram space in response to the determination of the first trajectory and the second trajectory, wherein the third region and the fourth region are associated with the first object and spaced apart by a half rotation, and wherein the third region and the fourth region are obscured by the second object; and
   to determine the trajectory sum further comprises to determine the trajectory sum in response to interpolation of the sinogram data.

9. The computing device of claim 6, further comprising:
a combined motion engine to subtract sinogram data associated with the first object from the sinogram data;
wherein to determine the second trajectory sum comprises to determine the second trajectory sum in response to subtraction of the sinogram data.

10. The computing device of claim 6, wherein the first trajectory comprises a stationary trajectory and the second trajectory comprises a non-stationary trajectory.

11. One or more computer-readable storage media comprising a plurality of instructions that, when executed, cause a computing device to:
capture sinogram data indicative of a first object using a computed tomographic (CT) scanner, wherein the sinogram data comprises projection data captured by the CT scanner arranged in a sinogram space;
determine a first trajectory of the first object as a function of the sinogram data, wherein to determine the first trajectory comprises to: (i) determine a set of projection intersections, wherein each projection intersection is defined by an adjacent, sequential pair of projections, wherein each of the projections is associated with a point of interest of the first object, (ii) determine a curve defined by the set of projection intersections, (iii) determine a tangent line that touches the curve at two points, (iv) determine a first motion path based on intersections of the projections and the tangent line, and (v) determine the first trajectory based on the first motion path;
determine a trajectory sum as a function of the sinogram data and the first trajectory, wherein the trajectory sum is associated with a portion of the first object, and wherein to determine the trajectory sum comprises to calculate a line integral of filtered projection data along the first trajectory in the sinogram space of the sinogram data; and
generate an image of the first object in based on determining the trajectory sum.

12. The one or more computer-readable storage media of claim 11, further comprising a plurality of instructions that, when executed, cause the computing device to:
determine a second trajectory of a second object; and
determine a second trajectory sum as a function of the sinogram data and the second trajectory, wherein the second trajectory sum is associated with a portion of the second object;
wherein to capture the sinogram data comprises to capture sinogram data indicative of the first object and the second object; and
wherein to generate the image comprises to generate a merged image of the first object and the second object based on determining the second trajectory sum.

13. A method for computed tomographic (CT) imaging, the method comprising:
capturing, by a computing device, sinogram data indicative of a first object using a CT scanner, wherein the sinogram data comprises projection data captured by the CT scanner arranged in a sinogram space;
determining, by the computing device, a first trajectory of the first object as a function of the sinogram data, wherein determining the first trajectory comprises: (i) determining a set of projection intersections, wherein each projection intersection is defined by an adjacent, sequential pair of projections, wherein each of the projections is associated with a point of interest of the first object, (ii) determining a curve defined by the set of projection intersections, iii) determining a tangent line that touches the curve at two points, (iv) determining a first motion path based on intersections of the projections and the tangent line, and (v) determining the first trajectory based on the first motion path;
determining, by the computing device, a trajectory sum as a function of the sinogram data and the first trajectory, wherein the trajectory sum is associated with a portion of the first object, and wherein determining the trajectory sum comprises calculating a line integral of filtered projection data along the first trajectory in the sinogram space of the sinogram data; and
generating, by the computing device, an image of the first object based on determining the trajectory sum.

14. The method of claim 13, further comprising:
determining, by the computing device, a second trajectory of a second object; and
determining, by the computing device, a second trajectory sum as a function of the sinogram data and the second trajectory, wherein the second trajectory sum is associated with a portion of the second object;
wherein capturing the sinogram data comprises capturing sinogram data indicative of the first object and the second object; and
wherein generating the image comprises generating a merged image of the first object and the second object based on determining the second trajectory sum.

* * * * *